(12) United States Patent
Akada

(10) Patent No.: US 9,915,677 B2
(45) Date of Patent: Mar. 13, 2018

(54) DATA ACQUISITION METHOD OF SUBSTRATE PROCESSING APPARATUS AND SENSING SUBSTRATE

(75) Inventor: Hikaru Akada, Koshi (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 1314 days.

(21) Appl. No.: 13/537,637

(22) Filed: Jun. 29, 2012

(65) Prior Publication Data

US 2013/0006547 A1    Jan. 3, 2013

(30) Foreign Application Priority Data

Jul. 1, 2011    (JP) ................... 2011-147582

(51) Int. Cl.
*G01P 5/12* (2006.01)
*G01P 13/04* (2006.01)

(52) U.S. Cl.
CPC .............. *G01P 5/12* (2013.01); *G01P 13/045* (2013.01)

(58) Field of Classification Search
CPC ....................................................... G01P 5/12
See application file for complete search history.

(56) References Cited

U.S. PATENT DOCUMENTS

| | | | | |
|---|---|---|---|---|
| 4,637,253 A * | 1/1987 | Sekimura | ................. | G01F 1/698 73/170.12 |
| 4,885,937 A * | 12/1989 | Tanaka | ................... | G01F 1/6845 73/170.12 |
| 5,461,910 A * | 10/1995 | Hodson | .................... | G01P 13/04 73/170.12 |
| 6,424,022 B1 * | 7/2002 | Wu | ......................... | H01L 23/552 257/547 |
| 6,502,459 B1 * | 1/2003 | Bonne | .................... | G01F 1/6845 73/170.11 |
| 6,631,638 B2 * | 10/2003 | James | .................... | G01F 1/6845 73/204.26 |

FOREIGN PATENT DOCUMENTS

| | | |
|---|---|---|
| JP | 56-4026 A | 1/1981 |
| JP | 60-128172 A | 8/1985 |
| JP | 06-265564 A | 9/1994 |
| JP | 10-068647 A | 3/1998 |
| JP | 2003-106883 A | 4/2003 |
| JP | 2004-191189 A | 7/2004 |
| JP | 2007-035787 A | 2/2007 |
| KR | 10-2003-0064396 A | 7/2003 |

\* cited by examiner

*Primary Examiner* — Hyun Park
(74) *Attorney, Agent, or Firm* — Nath, Goldberg & Meyer; Jerald L. Meyer; Annie Kock

(57) ABSTRACT

A data acquisition method of a substrate processing apparatus for acquiring data on gas current directions in a plurality of measurement regions on a surface of a substrate, includes: loading a sensing substrate having a plurality of pairs of sensors on a loader, wherein each pair of sensors includes a first sensor and a second sensor configured to acquire vector data of the gas current on the surface of the sensing substrate; acquiring vector data of the gas current in a first linear direction by the first sensor; acquiring vector data of the gas current in a second linear direction slanted to the first linear direction by the second sensor; and combining the gas current vectors based on a starting point associated with the respective pair of sensors; and calculating a gas current direction from the starting point associated with the respective pair of sensors.

8 Claims, 23 Drawing Sheets

FIG. 8
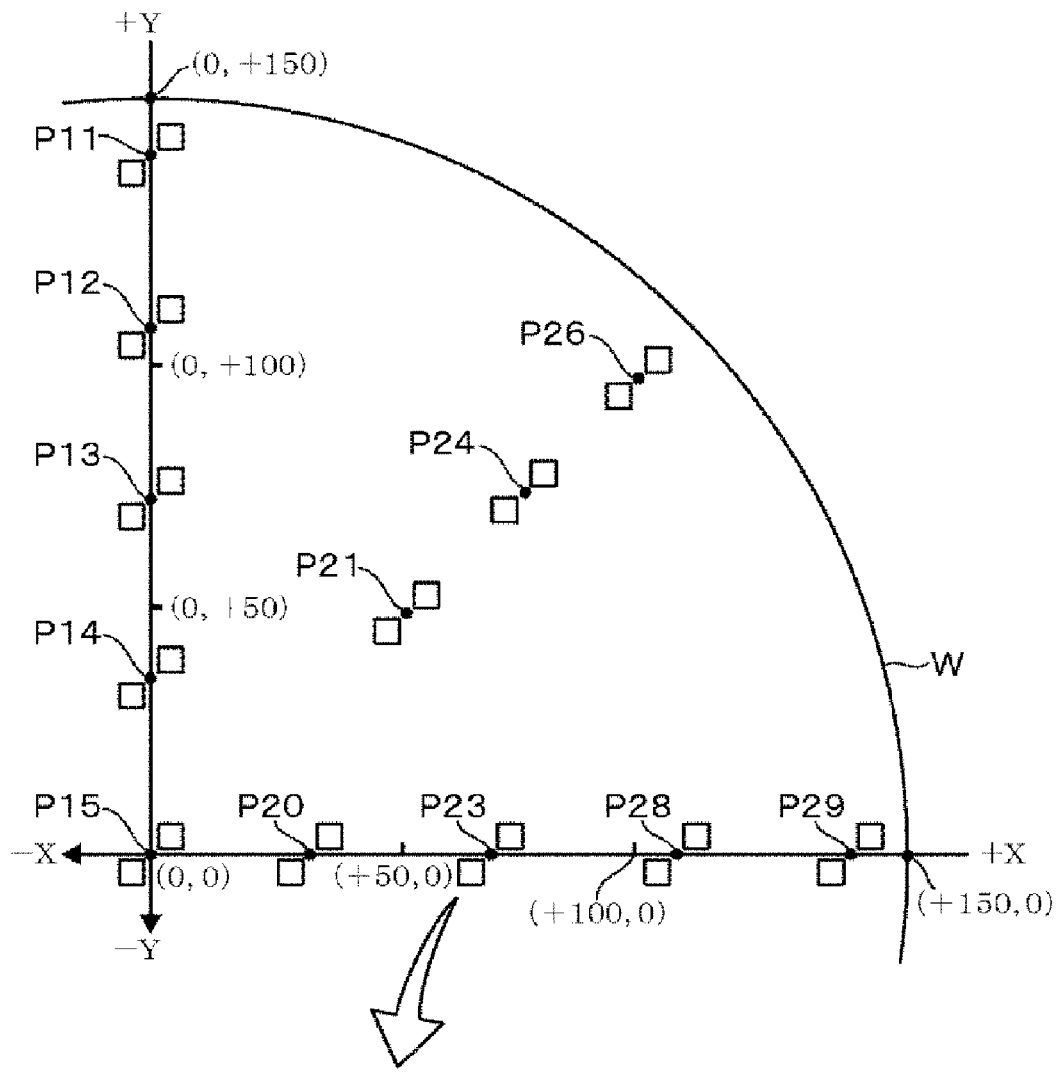
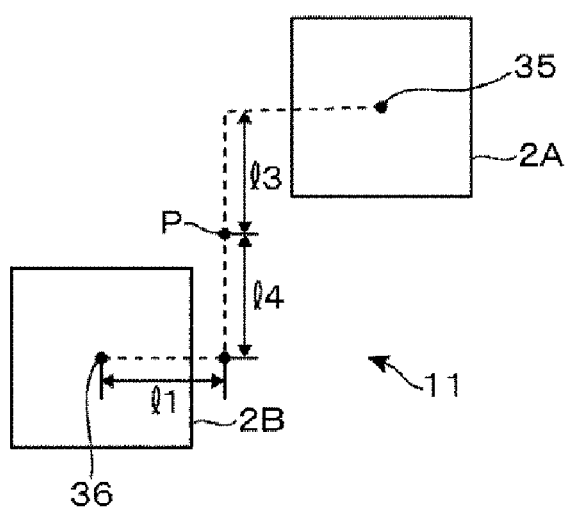

FIG. 14

| Electrodes corresponding to disconnected wirings | | | | | Vx(Vy) | Ax(Ay) |
|---|---|---|---|---|---|---|
| 22A | 25A | 25A | 23A | 24A | | |
| × | | | | | 1.6V | 0mA |
| | × | | | | 1.6V | 4~5mA |
| | | × | | | 1.6V | 0mA |
| | | | × | | 0V | 2mA |
| | | | | × | 0V | 2mA |
| × | × | | | | 1.6V | 0mA |
| × | | × | | | 1.6V | 0mA |
| × | | | × | | 0V | 0mA |
| × | | | | × | 0V | 0mA |
| | × | × | | | 1.6V | 0mA |
| | × | | × | | 0V | 4~5mA |
| | × | | | × | 0V | 4~5mA |
| | | × | × | | 0V | 0mA |
| | | × | | × | 0V | 0mA |
| | | | × | × | 0V | 2mA |
| × | × | × | | | 1.6V | 0mA |
| × | × | | × | | 0V | 0mA |
| × | × | | | × | 0V | 0mA |
| × | | × | × | | 0V | 0mA |
| × | | × | | × | 0V | 0mA |
| × | | | × | × | 0V | 0mA |
| | × | × | × | | 0V | 0mA |
| | × | × | | × | 0V | 0mA |
| | × | | × | × | 0V | 4~5mA |
| | | × | × | × | 0V | 0mA |
| × | × | × | × | | 0V | 0mA |
| × | × | × | | × | 0V | 0mA |
| × | × | | × | × | 0V | 0mA |
| × | | × | × | × | 0V | 0mA |
| | × | × | × | × | 0V | 0mA |
| × | × | × | × | × | 0V | 0mA |

FIG. 15
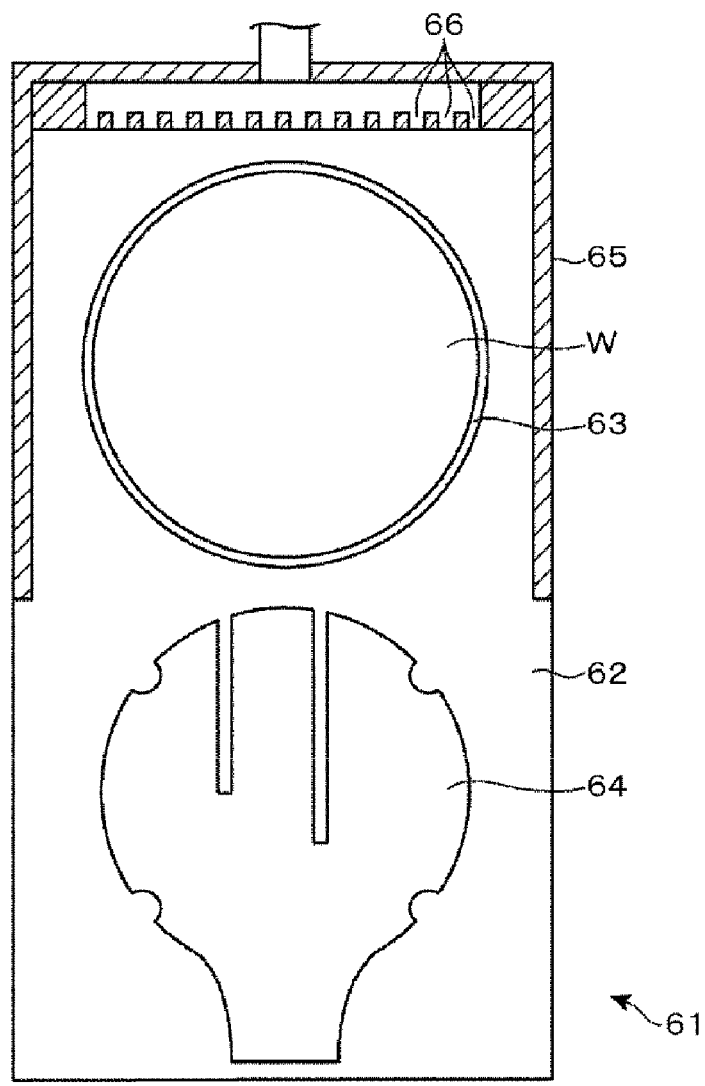
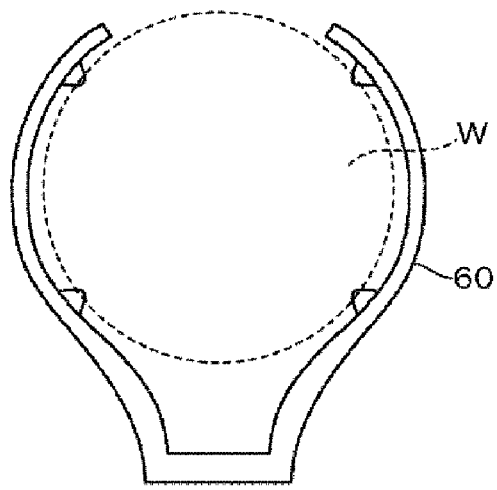

DATA ACQUISITION METHOD OF SUBSTRATE PROCESSING APPARATUS AND SENSING SUBSTRATE

CROSS-REFERENCE TO RELATED APPLICATION

This application claims the benefit of Japanese Patent Application No. 2011-147582, filed on Jul. 1, 2011, in the Japan Patent Office, the disclosure of which is incorporated herein in its entirety by reference.

TECHNICAL FIELD

The present disclosure relates to data acquisition using sensors in a substrate processing apparatus that includes a plurality of modules, the data acquisition method being used on a substrate.

BACKGROUND

In a photoresist process, which is one of a semiconductor manufacturing process, a resist film is coated on a semiconductor wafer (hereinafter abbreviated as a "wafer") serving as a substrate to expose and/or develop the wafer with a predetermined pattern, thereby forming a pattern of resist. The wafer is subjected to a heat treatment before and after the resist film is coated or before and after the resist film is developed.

In some cases, modules of a substrate processing apparatus perform processes for the wafer while generating a gas current on the surface of the wafer. For example, a heating module performs the heating process under a state where the gas current is generated on the wafer surface in order to prevent sublimates from being attached to the wafer, which may be derived from various films such as the resist film formed on the wafer. Additionally, in forming the resist film, a spin coating is also used to supply gas onto the wafer surface from above a cup-like component onto which the wafer is loaded, while exhausting the interior of the cup-like component, such that mists cannot be attached to the wafer.

However, if the direction and speed of the gas current generated in different portions of the planar surface of the wafer are in disorder, a distribution of temperature on the planar surface of the wafer is also in disorder, which may result in deterioration of process uniformity on the surface of the wafer. In addition, deviations may be possible in the direction and speed of gas currents between different modules which perform the same process for different wafers, which may result in deterioration of process uniformity between wafers. In order to prevent such deterioration of process uniformity, gas currents of module(s) has been adjusted by measuring the direction and speed of the gas currents through a simulation by a computer. However, due to circumstances that require higher process uniformity on a planar surface of a wafer and between wafers, there is a need for measuring a distribution of direction and speed of gas currents on the planar surface of the wafer with higher precision by a substrate processing module.

Currently, known module techniques that utilize sensors are insufficient for overcoming the above problems since they cannot measure the distribution of gas current directions and speeds on a wafer plane.

SUMMARY

The present disclosure provides a technique for acquiring data on the gas current directions in different portions of the planar surface of a substrate.

According to one embodiment of the present disclosure, there is provided a data acquisition method of a substrate processing apparatus including a loader on which a substrate is loaded, for acquiring data on the gas current directions in a plurality of measurement regions on a surface of the substrate loaded on the loader, the method comprising: loading a sensing substrate having a plurality of pairs of sensors formed on a surface of the sensing substrate on the loader, wherein each pair of sensors includes a first sensor and a second sensor configured to acquire vector data of the gas current on the surface of the sensing substrate; acquiring vector data of the gas current in a first linear direction along the surface of the sensing substrate by the first sensor; acquiring vector data of the gas current in a second linear direction slanted relative to the first linear direction along the surface of the sensing substrate by the second sensor; combining the gas current vectors acquired by the first and second sensors based on a starting point associated with the respective pair of sensors from a plurality of starting points respectively associated with the plurality of pair of sensors; and calculating a gas current direction from the starting point associated with the respective pair of sensors.

According to another embodiment of the present disclosure, there is provided a sensing substrate for a substrate processing apparatus including a loader on which a substrate is loaded, for acquiring data on gas current directions in a plurality of measurement regions on a surface of the substrate loaded on the loader, comprising: a plurality of first sensors for acquiring vector data of the gas current in a first linear direction along a surface of the sensing substrate; a plurality of second sensors paired with the first sensors for acquiring vector data of the gas current in a second linear direction slanted relative to the first linear direction along the surface of the sensing substrate; and a signal path for outputting a signal from each pair of sensors to a controller, wherein the controller is configured to combine the gas current vectors acquired by the first and second sensors of the same pair of sensors based on a starting point associated with each pair of sensors; and calculate a gas current direction from the starting point.

BRIEF DESCRIPTION OF THE DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

FIG. 8 is a plan view of a sensing wafer, which illustrates a relationship between each pair of sensors and a starting point, according to some embodiments.

FIG. 14 is a chart illustrating a relationship between a wiring disconnection and an output, according to some embodiments.

FIG. 15 is a plan view of a heating module to which a sensing wafer is applied, according to some embodiments.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

<First Embodiment>

Figure 1:
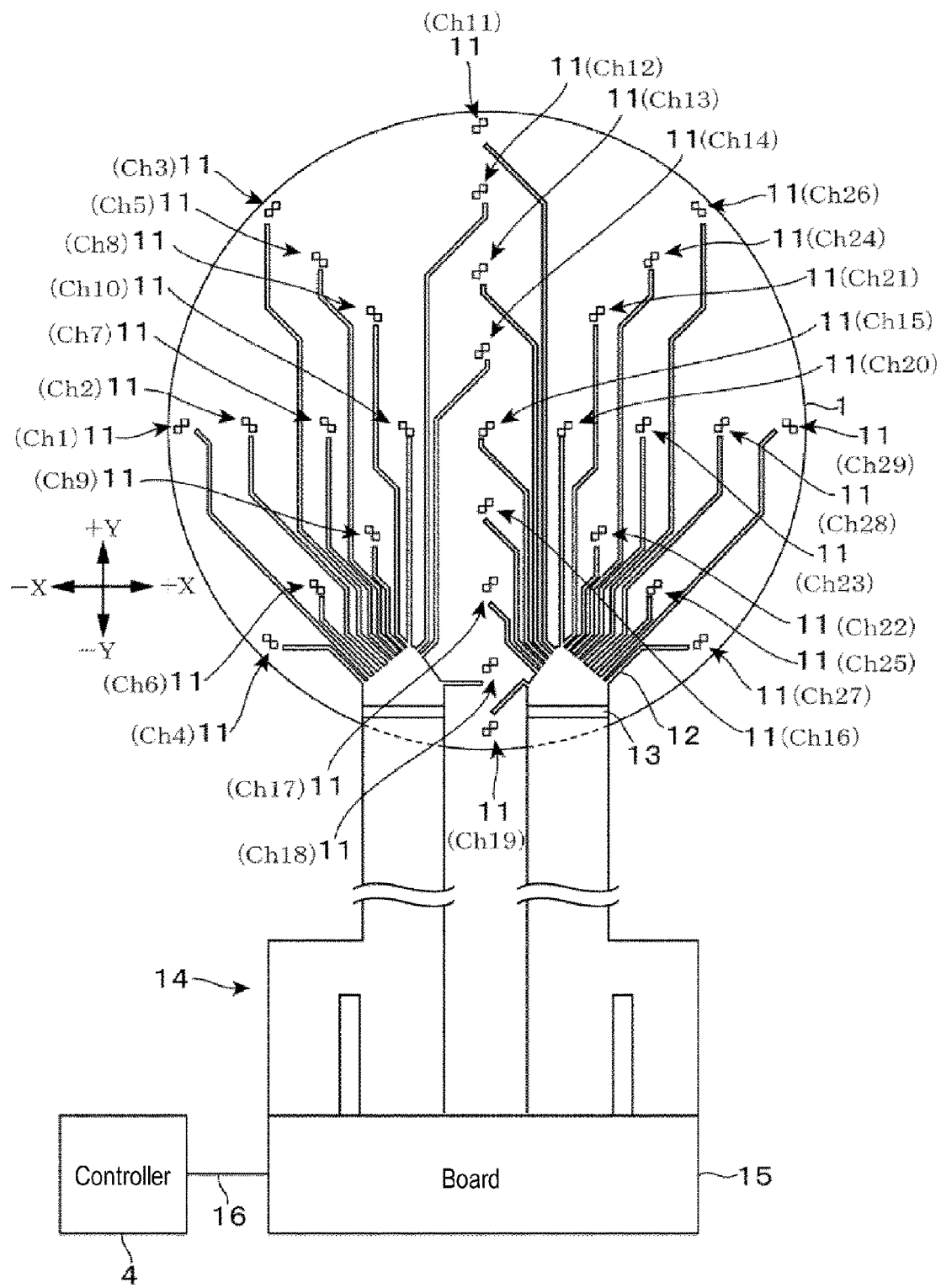
FIG. 1 is a plan view of a sensing wafer according to an embodiment of the present disclosure.

FIG. 1 is a plan view of a sensing wafer 1 according to a first embodiment of the present disclosure. The sensing wafer 1 is loaded in a substrate processing apparatus for detecting conditions of gas current directions and speeds before a wafer W is processed by the substrate processing apparatus. Once data is acquired on the gas current directions and speeds from various sensors on the sensing wafer 1, the sensing wafer 1 is unloaded, wafer W may then be loaded, and the data is utilized during processing of the wafer W. The sensing wafer 1 has substantially the same shape as a wafer W used during semiconductor manufacturing, for example, has its diameter of 300 mm and is made of silicon. The sensing wafer 1 is used to detect the gas current directions and speeds in different portions of the surface plane of the sensing wafer 1 and to estimate the gas current directions and speeds in different portions of the planar surface of the wafer W based on the detected gas current direction and speed. A surface of the sensing wafer 1 is provided with 29 pairs of sensors 11 used to measure the gas current directions and speeds. One of these pairs of sensors 11 is placed in the center of the sensing wafer 1, while other remaining pairs of sensors 11 are placed radially in 8 directions of the sensing wafer 1 around the center of the sensing wafer 1.

The surface of the sensing wafer 1 is formed with, for example, a conductor pattern 12 which is directed from the vicinity of one end of the wafer 1 to a pairs of sensors 11, and is formed by, for example, printing. The conductor pattern 12 is made of metal, for example, aluminum, to prevent decrease in a yield of semiconductor products due to metallic contamination of the wafer W. In addition, although the conductor pattern 12 is actually constituted by a plurality of lines, it is shown in FIG. 1 that the conductor pattern 12 is shown as a single line which is a collection of plural lines for the sake of simplicity. One end of the sensing wafer 1 is provided with one end side of a flexible printed board (FPB) 14 via a connector 13. The other end side of the FPB 14 is connected to a board 15 on which various circuit elements, which will be described later, are formed. In FIG. 1, reference numeral 16 denotes a cable. A controller 4, such as a computer, denoted by reference numeral 4 in FIG. 1 will be described later. Signal exchange between each pair of sensors 11 and the controller 4 is made via the conductor pattern 12, the connector 13, the FPB 14, wirings formed on the board 15 and the cable 16.

Figure 2:
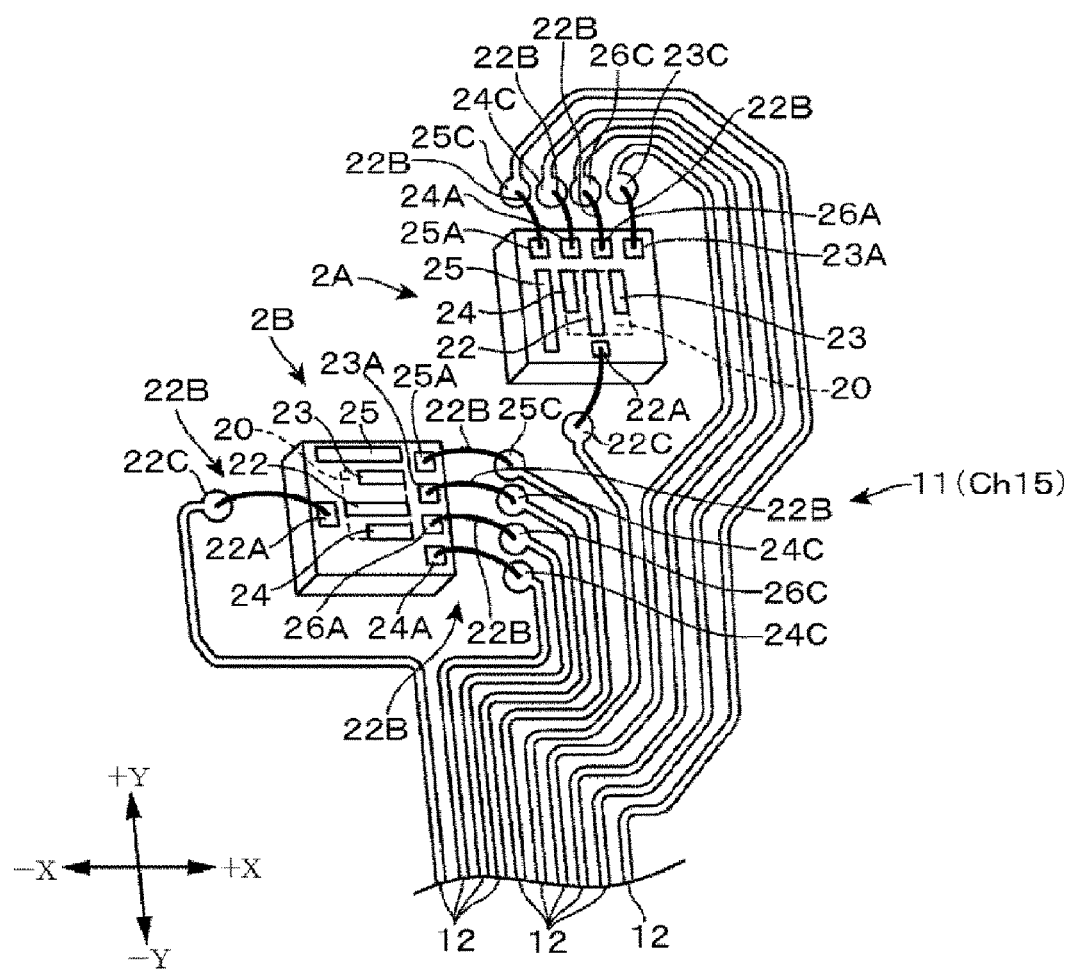
FIG. 2 is a perspective view of a pair of sensors for use on a wafer, according to some embodiments.

The 29 pairs of sensors 11 serve as channels (Ch) 1 to 29, respectively. Each pairs of sensors of each channel have the same configuration. As an example, FIG. 2 is an enlarged perspective view illustrating a pair of sensors 11 of Ch 15 at the center of the sensing wafer 1. This pair of sensors 11 includes gas current speed sensors 2A and 2B for acquiring data on gas current speeds. Each of the gas current speed sensors 2A and 2B outputs a signal based on a speed of gas current in a predetermined linear direction on the surface thereof. The gas current speed sensors 2A and 2B have the same configuration except that they are arranged in different directions in which the speed of gas current can be detected.

As one example, the gas current sensor 2A will be described with reference to side longitudinal sectional views of FIGS. 3 and 4. The gas current speed sensor 2A is formed of a square chip having the length of one side, for example, at 1.6 mm, when viewed from top. A recess 21 is formed in the center of the chip and an insulating thin film 20 is formed to cover the recess 21. On the insulating thin film 20 are formed a heater 22 and thermopiles 23 and 24 disposed on both sides of the heater 22 interposed therebetween. In addition, a temperature sensor 25, which may be a resistance temperature detector, is provided in the chip and resistance of the temperature sensor 25 is varied depending on the ambient temperature.

Figure 5:
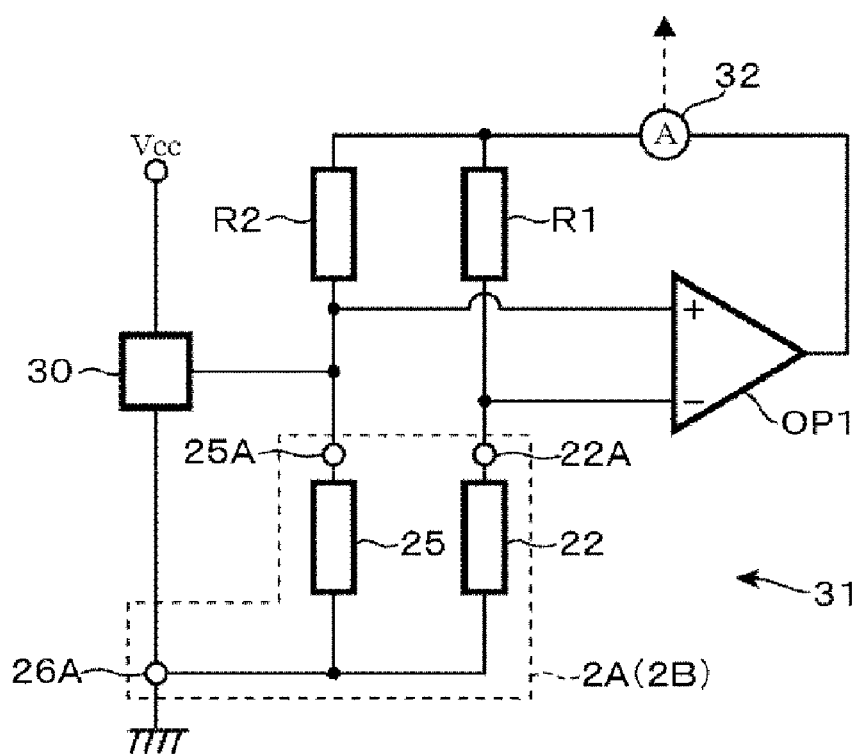
FIG. 5 is a schematic view illustrating circuit elements constituting the gas current speed sensor, according to some embodiments.

The heater 22 and the temperature sensor 25 constitute a temperature compensation circuit 31 shown in FIG. 5, according to some embodiments. In the temperature compensation circuit 31, the heater 22 and the temperature sensor 25 are connected in series to fixed resistors R1 and R2, respectively. A midpoint between the heater 22 and the fixed resistor R1 and a midpoint between the temperature sensor 25 and the fixed resistor R2 are connected to an inverted input terminal and a non-inverted input terminal of an operational amplifier OP1, respectively. An output terminal of the operational amplifier OP1 is connected to the fixed resistors R1 and R2 via a detection circuit 32 which detects current supplied to a bridge circuit. The current detection circuit 32 detects a current value between the operational amplifier OP1 and the fixed resistors R1 and R2 and output a detection signal for the current value to the controller 4 which will be described later. For the sake of simplicity, this detection signal is considered as detected current Ax or Ay. Detected current Ax is the detected current in the temperature compensation circuit 31 including the gas current speed sensor 2A and detected current Ay is the detected current in the temperature compensation circuit 31 including the gas current speed sensor 2B.

The heater 22 and the temperature sensor 25 are connected to a ground. As such, the heater 22, the temperature sensor 25 and the fixed resistors R1 and R2 form the bridge circuit. In addition, a current supply circuit 30 is provided between the ground and an electrode to which a power source voltage Vcc is applied. The current supply circuit 30 is connected between the fixed resistor R2 and the temperature sensor 25. The current supply circuit 30 controls current supplied to the bridge circuit. The higher ambient temperature provides higher resistance of the temperature sensor 25. The higher resistance of the temperature sensor 25 provides a higher voltage between the resistor R2 and the temperature sensor 25 which then provides higher current to be supplied from the current supply circuit 30 to the bridge circuit.

The temperature of the heater 22 is varied depending on a magnitude of gas current and power is supplied from the operational amplifier OP1 to compensate for heat by the heater 22. In more detail, if the gas current becomes larger and the temperature of the heater 22 becomes lower, since resistance Rh of the heater 22 becomes decreased and an input voltage of the negative (−) terminal of the operation amplifier OP1 becomes lower, a voltage output from the operation amplifier OP1 to the bridge circuit becomes higher. Then, a voltage applied to the heater 22 and the temperature sensor 25 becomes higher. This increased voltage results in higher temperature of the heater 22. On the contrary, if the gas current becomes smaller, the voltage output from the operation amplifier OP1 to the bridge circuit becomes lower and the temperature of the heater 22 becomes lower. This allows the temperature of the heater 22 to be kept constant.

In addition, if the ambient temperature is varied and the resistance of the temperature sensor 25 is changed accordingly, a voltage ratio of the temperature sensor 25 to the fixed resistance R2, a potential of the inverted input terminal of the operational amplifier OP1, an output of the operation amplifier OP1 and an output of the heater 22 are also changed in turn. In more detail, an increase of the ambient temperature results in an increase of both of the temperature and resistance Rb of the temperature sensor 25. Since the resistance of the fixed resistors R1 and R2 is configured not to be varied and a ratio Rh/Rb is constant under the balancing condition of the bridge circuit, the resistance Rh is increased and the temperature of the heater 22 is increased. On the contrary, a decrease of the ambient temperature results in a decrease of the resistance of the temperature sensor 25, the resistance Rh and the temperature of the heater 22. This allows the temperature of the heater 22 to be compensated for a higher temperature by a predetermined degree than the ambient temperature. The current supply circuit 30 serves to prevent a deviation between a change in the ambient temperature and a change in the temperature of the heater 22 by controlling the current as described above. Various circuit elements such as the operational amplifier OP1, the fixed resistors R1 and R2, the current supply circuit 30, the current detection circuit 32 and so on in the temperature compensation circuit 31 are formed on the board 15.

Figure 6:
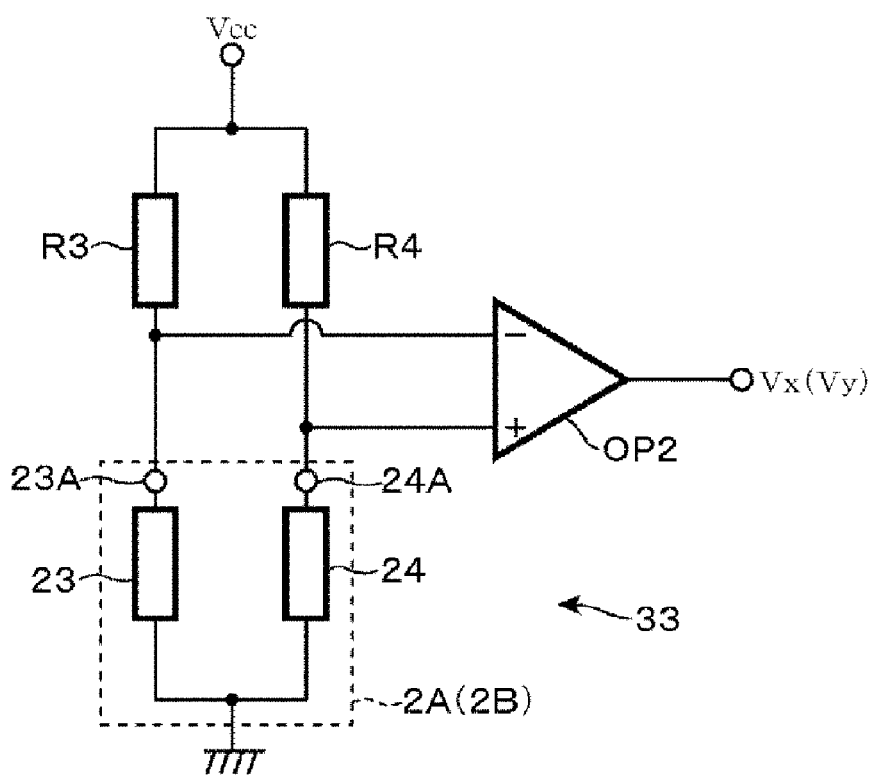
FIG. 6 is another schematic view illustrating circuit elements constituting the gas current speed sensor, according to some other embodiments.

Thermopiles 23 and 24 constitute a gas current speed detection circuit 33 as shown in FIG. 6. The thermopiles 23 and 24 are connected in series to fixed resistance R3 and R4, respectively and midpoints therebetween are connected to an inverted input terminal and a non-inverted input terminal of an operational amplifier OP2, respectively. The fixed resistance R3 and R4 are connected to the electrode to which the power source voltage Vcc is applied and the thermopiles 23 and 24 are connected to ground, thereby forming a bridge circuit.

Figure 7:
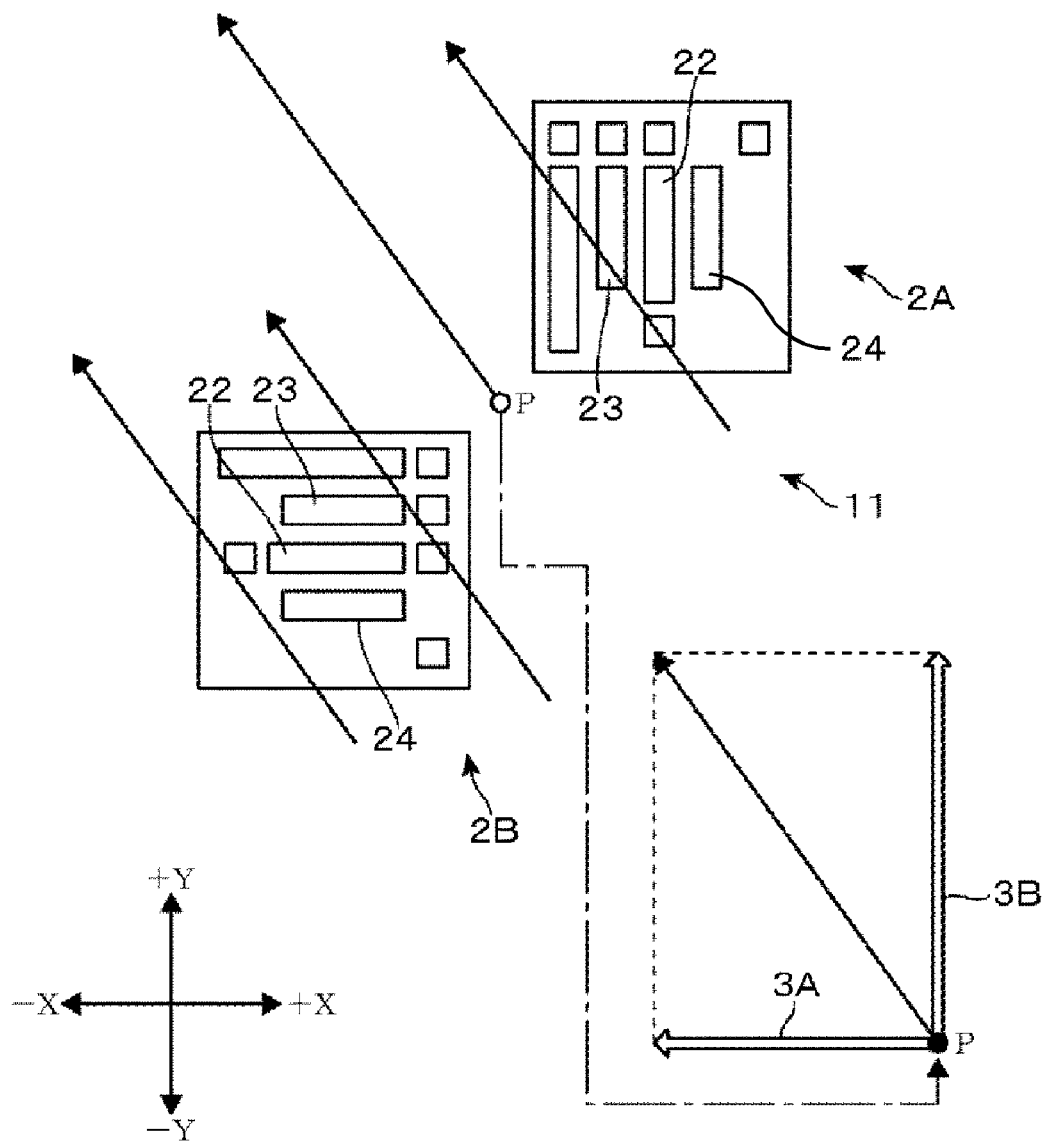
FIG. 7 is a schematic view illustrating the principle of measurement by a sensing wafer, according to some embodiments.

Operation of the gas current speed detection circuit 33 will be described below with reference to FIGS. 3 and 4. In FIGS. 3 and 4, a distribution of heat emitted from the heater 22 is indicated by regions 27a, 27b and 27c directing to the heater 22 and having higher temperature in order. As shown in FIG. 3, under a state where no gas current is generated in the arrangement direction of the thermopiles 23 and 24, the thermopiles 23 and 24 receive the same amount of heat and a predetermined voltage is output from the operational amplifier OP2. As shown in FIG. 7, if a gas current is generated in the arrangement direction, the heat distribution of the heater 22 is biased depending on a speed of the gas current and the temperature of the thermopile (denoted by reference numeral 23 in the figure) at the downstream becomes higher than the temperature of the thermopile (denoted by reference numeral 24 in the figure) at the upstream. Such a change in temperature causes a change in resistance of the thermopiles 23 and 24, which results in a change in an output from the operational amplifier OP2. That is, the output from the operational amplifier OP2 depends on the speed of the gas current in the arrangement direction.

Figure 3:
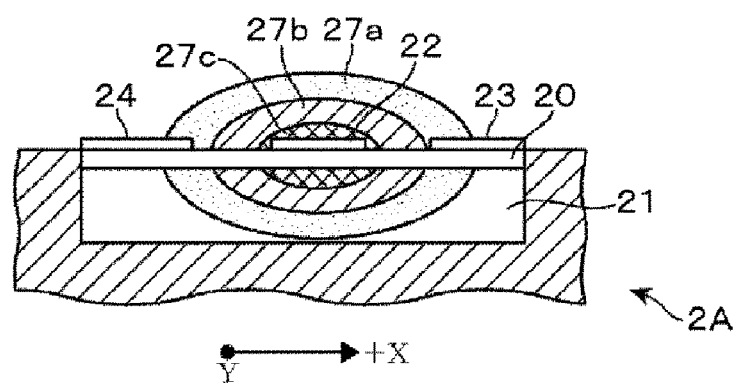
FIG. 3 is a side longitudinal sectional view of a gas current speed sensor constituting the pair of sensors, according to some embodiments.
Figure 4:
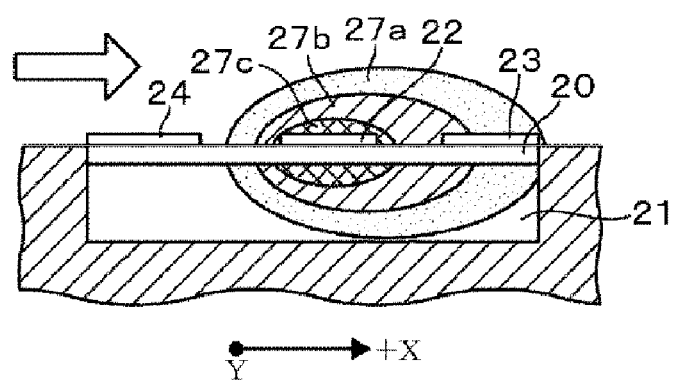
FIG. 4 is another side longitudinal sectional view of the gas current speed sensor, according to some other embodiments.

Under a state shown in FIG. 4 where the temperature of the thermopile 23 is increased, resistance of the thermopile 23 becomes higher than resistance of the thermopile 24 and an input to the negative terminal of the operational amplifier OP2 becomes larger relative to the state shown in FIG. 3. Contrary to that shown in FIG. 4, if a gas current is generated toward the thermopile 24 and the temperature of the thermopile 24 is increased, the resistance of the thermopile 24 becomes higher than the resistance of the thermopile 23 and an input to the positive terminal of the operational amplifier OP2 becomes large. That is, the gas current speed sensors 2A and 2B can detect the gas current direction and speed in the arrangement direction. The output from the gas current speed detection circuit 33 including the gas current speed sensor 2A is denoted by Vx and the output from the gas current speed detection circuit 33 including the gas current speed sensor 2B is denoted by Vy. The operational amplifier OP2 and the fixed resistors R3 and R4 of the gas current speed detection circuit 33 are formed on the board 15.

Reference numerals 22A to 26A in FIGS. 2, 5 and 6 denote electrodes formed on surfaces of the gas current speed sensors 2A and 2B. In a circuit diagram of FIG. 5, the electrode 22A is interposed between the heater 22 and the operational amplifier OP1 and the electrode 25A is interposed between the temperature sensor 25 and the operational amplifier OP1. The electrode 26A is connected to the heater 22, the temperature sensor 25 and the ground. In a circuit diagram of FIG. 6, the electrode 23A is interposed between the thermopile 23 and the operational amplifier OP2 and the electrode 24A is interposed between the thermopile 24 and the operational amplifier OP2. As shown in FIG. 2, these electrodes 22A to 26A are connected to electrodes 22C to 26C formed in a leading end of the conductor pattern 12 of the sensing wafer 1 via bonding wires 22B. In addition, the bonding wires 22B are omitted from the figures except FIG. 2 for the purpose of simplicity.

The gas current speed sensors 2A and 2B forming each pair of sensors 11 are disposed adjacent to each other, as shown in FIGS. 1 and 2. The thermopiles 23 and 24 of the gas current speed sensor 2A of each pair of sensors 11 are arranged in the same direction (X direction in this example). In this example, the thermopile 23 is arranged in the right side (+X side) in FIG. 1. The thermopiles 23 and 24 of the gas current speed sensor 2B of each pair of sensors 11 are arranged in the same direction (Y direction in this example). In this example, the thermopile 23 is arranged in the upper side (+Y side) in FIG. 1. The X direction is perpendicular to the Y direction.

The principle of measurement of the gas current directions and speeds by each pair of sensors 11 will be described with reference to FIG. 7. As described above, a gas current speed in the X direction and a gas current speed in the Y direction are detected by the gas current speed sensor 2A. Since the gas current speed sensors 2A and 2B of the same pair of sensors 11 are disposed adjacent to each other, it may be said that gas currents of the same direction and speed are generated on the surfaces of these gas current speed sensors 2A and 2B. In addition, since the gas current speed detected by the gas current speed sensor 2A is the gas current speed in the X direction, it may be said that this gas current speed corresponds to a vector component 3A in the X direction of the gas current. In addition, since the gas current speed detected by the gas current speed sensor 2B is the gas current speed in the Y direction, it may be said that this gas current speed corresponds to a vector component 3B in the Y direction of the gas current.

The controller 4, which will be described later, calculates and displays the gas current directions and speeds by combining the vector components in the X and Y directions with a point P set for each pair of sensors 11 as a starting point. Although it is shown in FIG. 7 that the point P is dragged out by an arrow of a chain line and is dislocated, the point P may actually be set at a position adjacent to the gas current speed sensors 2A and 2B indicated by a white point. Accordingly, it may be said that gas currents of the same direction and speed are generated around the point P.

As will be described later, in the controller 4, a position of each point P is defined by an XY coordinate system with the center of the wafer W as an origin. Since the diameter of the wafer W is 300 mm as mentioned above, X and Y are defined to be numerical values of +150 to −150. That is, a deviation by one numerical value in each of the X and Y directions corresponds to a deviation by 1 mm of the wafer W in each of the X and Y directions. However, the position of the point P may be defined by, for example, a slope with respect to the +X axis and a distance from the origin.

FIG. 8 shows positions of points P1 to P29 for corresponding channels. Since it is considered that the gas currents of the same direction and speed are flown on the surfaces of the gas current speed sensors 2A and 2B and around the point P, positions of the points P for each pair of sensors 11 are set near the gas current speed sensors 2A and 2B. In this example, a distance 11 between the center 35 of the gas current speed sensor 2A and the point P in the X direction, a distance 12 between the center 36 of the gas current speed sensor 2B and the point P in the X direction, a distance 13 between the center 35 and the point P in the Y direction, and a distance 14 between the center 36 and the point P in the Y direction are set to 1.43 mm.

Figure 9:
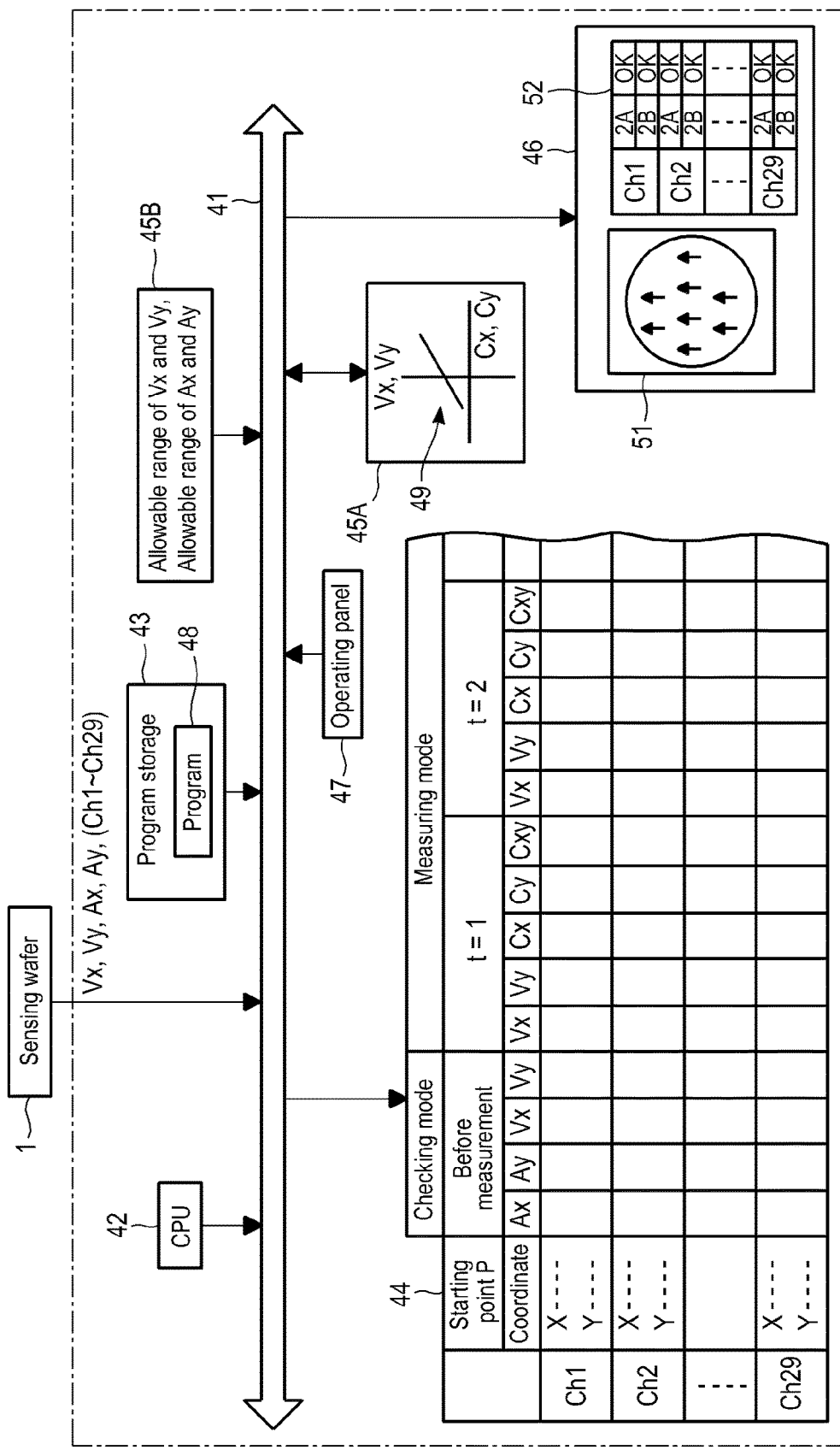
FIG. 9 is a block diagram of a controller connected to the sensing wafer, according to some embodiments.

The controller 4 will be described in detail with reference to FIG. 9. The controller 4 includes a CPU 42, a program storage 43, a table 44, memories 45A and 45B, a display unit 46 and an operating panel 47, all of which are interconnected via a bus 41. A program 48 is stored in the program storage 43. The program 48 contains instructions (steps) to calculate the gas current direction and speed of each channel, as described above, display the calculated gas current direction and speed on the display unit 46, and detect a problem of each channel, as will be described later. The program storage 43 may be implemented by a computer storage medium such as a flexible disk, a compact disk, a hard disk, a magneto-optical (MO) disk or the like.

The table 44 stores different types of data for different channels. Examples of the data may include: voltages Vx and Vy output from the gas current speed sensors 2A and 2B via the operational amplifier OP2 shown in FIG. 6; gas current speeds Cx and Cy in the X and Y directions, which are obtained from these voltages Vx and Vy, respectively; a gas current speed Cxy which is calculated from the gas current speeds Cx and Cy with the point P as a starting point, an XY coordinate of the starting point P; and detected currents Ax and Ay of the current detection circuit 32. These data are stored in association with each channel. The voltages Vx and Vy in the table 44 are acquired in short intervals or periods after the data acquisition data is started, and Vx, Vy, Cx, Cy and Cxy are stored in the table 44 in intervals, e.g., every hour. Thus, a distribution of the gas current directions and speeds of the sensing wafer 1 can be displayed at the point of time desired by a user. FIG. 9 shows that newer data are obtained for larger numerical values of t.

Figure 10:
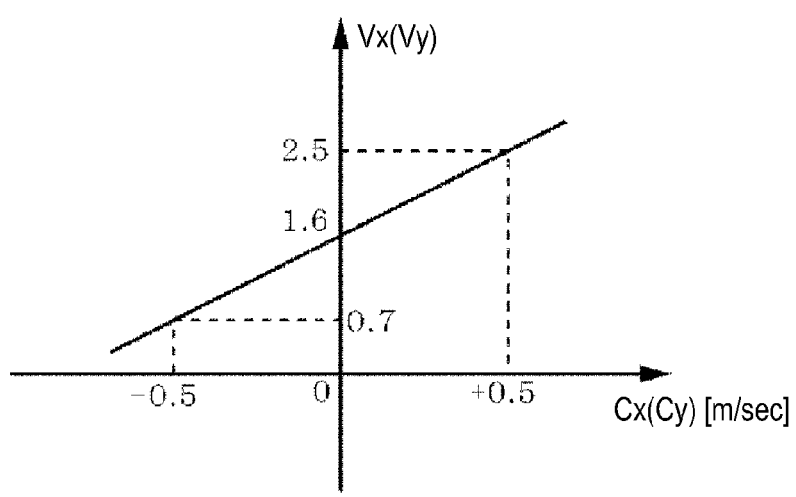
FIG. 10 is a graphical illustration of data stored in the controller, according to some embodiments.

A graph 49 shown in FIG. 10 is stored in the memory 45A. The graph 49 shows a relationship between the output voltages Vx and Vy, and the gas current speeds Cx and Cy (m/sec). In the graph, a vertical axis represents the output voltages and a horizontal axis represents the gas current speeds. Corresponding values of Cx and Cy in the graph 49 are read by a program 48 from Vx and Vy stored in the table 44. The Cx and Cy readings are stored in the table 44 in association with Vx and Vy.

A display unit 46 includes a display region 51 for displaying the calculated gas current direction and speed and a display region 52 for displaying the status of each channel. For example, the program 48 may calculate a gas current direction by adding a gas current speed in the X direction and a gas current speed in the Y direction, which are obtained by each pair of sensors 11, as described above. In addition, since an angle between the X direction and the Y direction is 90 degrees, Cxy can be calculated as $\{(Cx)^2+(Cy)^2\}^{1/2}$ and is stored in the table 44 in association with Cx and Cy.

Figure 11:
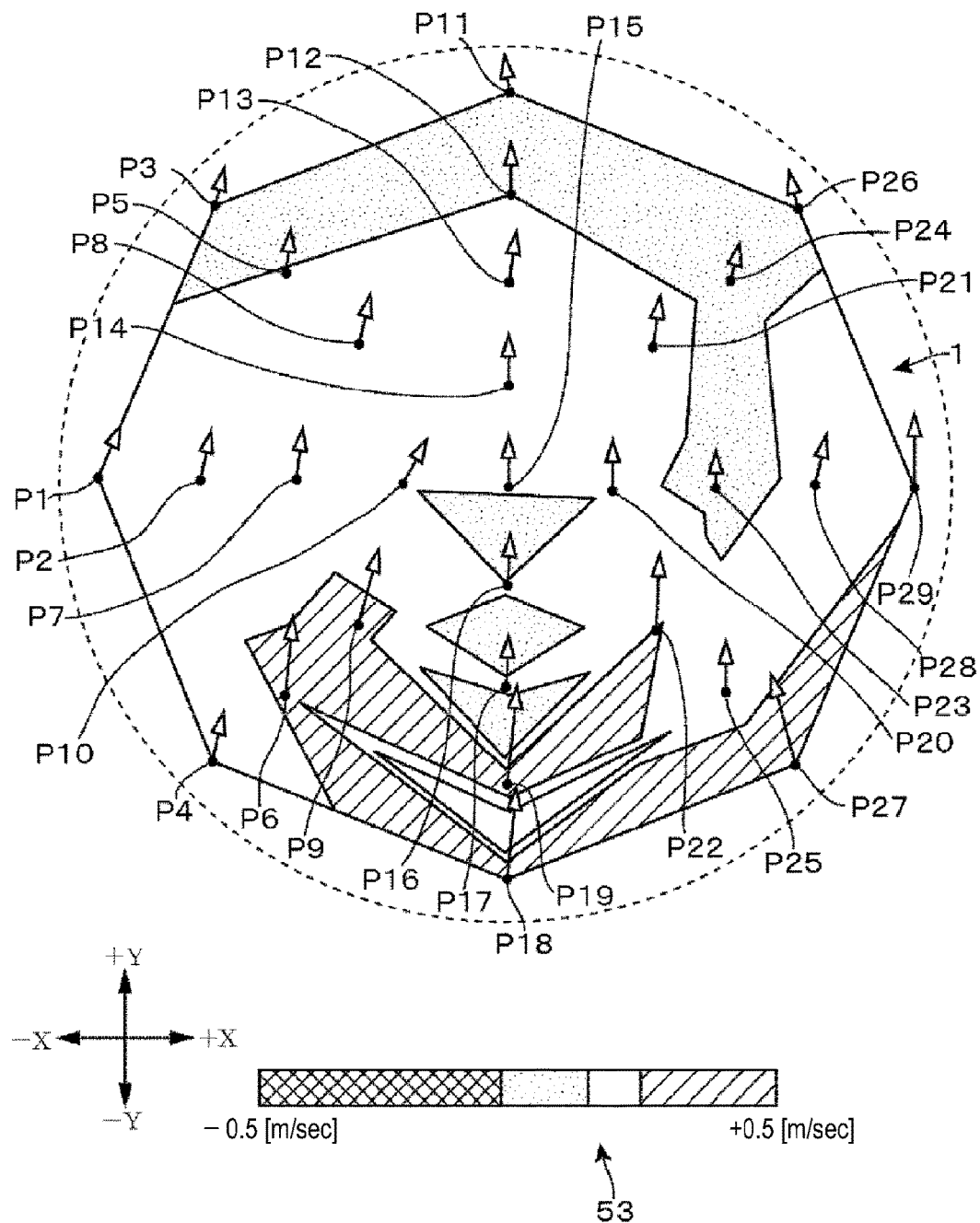
FIG. 11 is a view on a display showing an image of a distribution of the gas current directions and speeds displayed on a display unit of the controller, according to some embodiments.

FIG. 11 shows one example of a display in the display region 51. Starting points P are displayed at certain positions of the display region 51 based on set coordinates and the gas current directions calculated at the starting points P (indicated by arrows). The starting points P are denoted by reference numerals corresponding to channels, in the same manner as FIG. 8. Longer arrows indicate higher calculated gas current speeds Cxy. A distribution of gas current speeds Cxy for the sensing wafer 1 is indicated in color based on a gas current speed Cxy of each channel. A bar 53 showing the correspondence between color and a value of gas current speed Cxy below an image of the sensing wafer 1 allows a user to know values of gas current speeds Cxy in different portions of the planar surface of the sensing wafer 1.

However, although image display of an actual distribution of gas current speeds can be displayed using a color gradation, FIG. 11 shows a distribution of gas current speeds partitioned by contour lines for the sake of simplicity. It is shown in this example that values of gas current speeds Cxy are all positive (+), although values of Cxy are all negative (−) if the gas current direction is in the −Y direction. An external appearance of the sensing wafer 1 is indicated by a dotted line in FIG. 11, thereby allowing the user to know positions of the starting points P relative to the wafer 1.

The operating panel 47 may be implemented by, for example, a mouse or a keyboard. The user may use the operating panel 47 to direct start and stop functions for supplying power to the above-mentioned circuits included to each pair of sensors 11, start and stop functions for the of instruction of data from each pair of sensors 11, and ON and OFF functions for the display in the display regions 51 and 52. In addition, the user may use the operating panel 47 to alternate between a checking mode to check connection of the bonding wires 22B, which will be described later, and a measuring mode to acquire data of the gas current directions and speeds. In addition, the user may use the operating panel 47 to designate the elapsed time from a measurement starting point, so that the gas current speeds Cx and Cy acquired within the elapsed time are read and displayed as shown in FIG. 11. In addition, the user may use the operating panel 47 to sequentially read the acquired Cx and Cy from a starting point to ending point for measurements in a time series and to continuously display arrows indicating the gas current speeds and directions, as shown in FIG. 11, and color images on the display region 51. That is, changes in the gas current speeds and directions may be displayed with a moving picture.

The checking mode to check connection of electrodes of the pairs of sensors 11 and electrodes of the sensing wafer 1 by means of the bonding wires 22B provided in the controller 4 will be now described. Since the gas current speed sensors 2A and 2B are to be directly exposed to the gas current in order to show the gas current speed detection, wirings to connect electrodes of the gas current speed sensors 2A and 2B and electrodes of the sensing wafer 1 are also exposed to the gas current. Accordingly, the controller 4 includes the function of detecting deviation of the bonding wires 22B due to a change of pressure.

In this example, under a state where the bonding wires 22B are normally connected to the respective electrodes and no gas current is formed on the surface of the sensing wafer 1, detected currents Ax and Ay from each pair of sensors 11 are, for example, 2 mA and output voltages Vx and Vy are set to be, for example, 1.6 V. An example of wiring disconnection will be now described. If at least one of the connection between an electrode 23A and an electrode 23C of the sensing wafer 1 by means of a bonding wire 22B and the connection between an electrode 24A and an electrode 24C of the sensing wafer 1 by means of another bonding wire 22B is broken, no signal is input to the input terminal (+ terminal) of the operational amplifier OP2 and Vx and Vy become 0 V accordingly.

Figure 12:
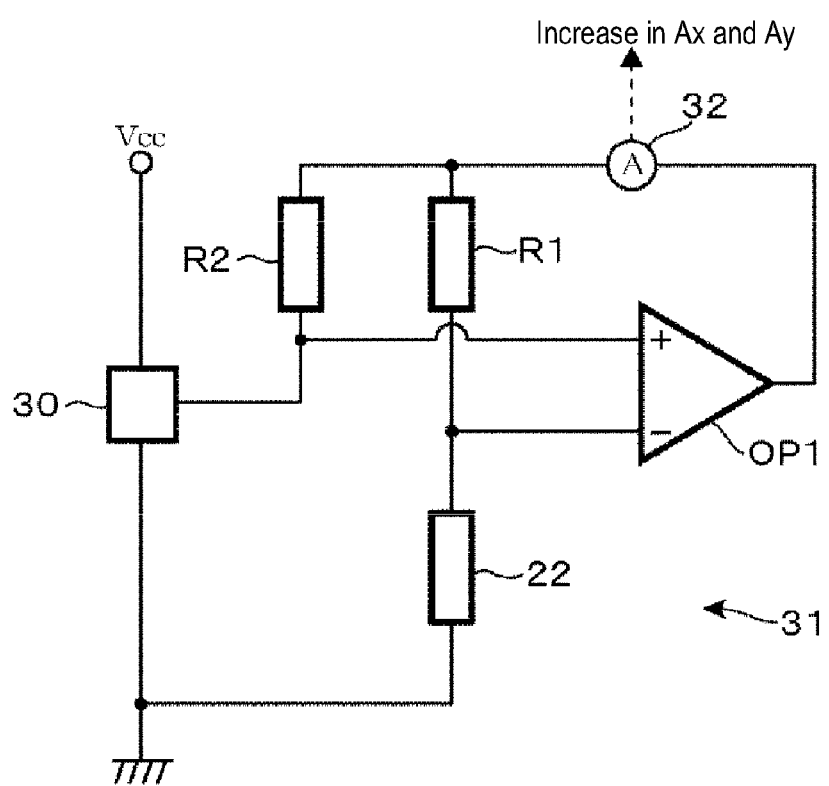
FIG. 12 is a schematic view illustrating circuit elements constituting the gas current speed sensor when there occurs an abnormality in wirings of a wafer, according to some embodiments.

If a connection between an electrode 25A and an electrode 25C of the sensing wafer 1 by means of a bonding wire 22B is broken, the configuration of the temperature compensation circuit 31 may be changed to that as shown in FIG. 12 to eliminate an action of resistance of the temperature sensor 25, and accordingly, an input signal to the input terminal of the operational amplifier OP1 may be increased and the output of the operational amplifier OP1 may be increased. Thus, Ax and Ay may be increased from 2 mA to, for example, 4 mA to 5 mA.

Figure 13:
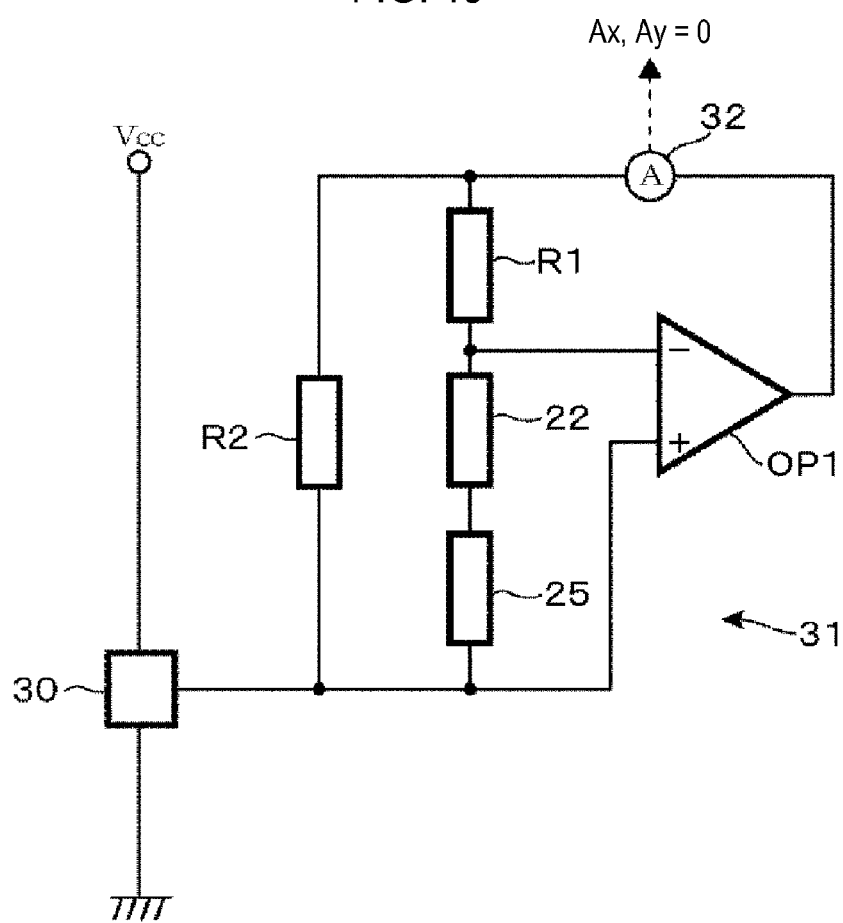
FIG. 13 is another schematic view illustrating circuit elements constituting the gas current speed sensor when there occurs an abnormality in wiring of a wafer, according to some embodiments.

If a connection of an electrode 26A and an electrode 26C of the wafer 1 by means of a bonding wire 22B is broken, the configuration of the temperature compensation circuit 31 may be changed to that as shown in FIG. 13. The output of the operational amplifier OP1 becomes unstable if current flows between the heater 22 and the temperature sensor 25. However, in this circuit configuration, no current flows between the heater 22 and the temperature sensor 25, and Ax and Ay become 0 mA accordingly. If a connection between an electrode 22A and an electrode 22C of the sensing wafer 1 is broken, no current flows into the heater 22 and no heat is generated. Accordingly the wafer 1 would not be affected by the gas current speed. When both of the connection of the electrode 23A and the connection of the electrode 24A are normal, Ax and Ay become 0 mA. Even if the connection between the electrode 25A and the electrode 25C of the sensing wafer 1 and the connection between the electrode 26A and the electrode 26C of the sensing wafer 1 are broken, no current flows into the heater 22 and no heat is generated. Accordingly, the sensing wafer 1 is not affected by the gas current speed. When both of the connection of the electrode 23A and the connection of the electrode 24A are normal, Ax and Ay become 0 mA.

FIG. 14 is a table showing a relationship between disconnected electrodes and Vx, Vy, Ax and Ay. In the table, electrodes marked with an "X" correspond to disconnected electrodes of the sensing wafer 1. When a measurement is made under a state where no gas current is formed, e.g., if wiring disconnection occurs, at least one of Vx and Vy or Ax and Ay is deviated from an allowable range. The program 48 determines whether Vx and Vy of each channel fall within a preset allowable range and whether detected currents Ax and Ay fall within a preset allowable range. If it is determined that one of Vx and Vy or one of Ax and Ay does not fall within the allowable range, an indication that wiring disconnection in one or both of the gas current speed sensors 2A and 2B of the corresponding channel occurs is displayed on the display region 52. In this manner, an indication that wiring disconnection in one or both of the gas current speed sensors 2A and 2B of all channels occurs is further displayed. In addition, such an alarm output is not limited to a screen display but may be, for example, a sound output. The memory 45B stores the allowable range of detected currents Ax and Ay and the allowable range of output voltages Vx and Vy. The allowable range of Ax and Ay is set to be lower than 4 mA and between a value slightly lower than 2 mA and a value slightly higher than 2 mA and the allowable range of Vx and Vy is set to be higher than 0 V and between a value slightly lower than 1.6 V and a value slightly higher than 1.6 V in such a manner that disconnection of the bonding wires 22B can be detected.

Figure 16:
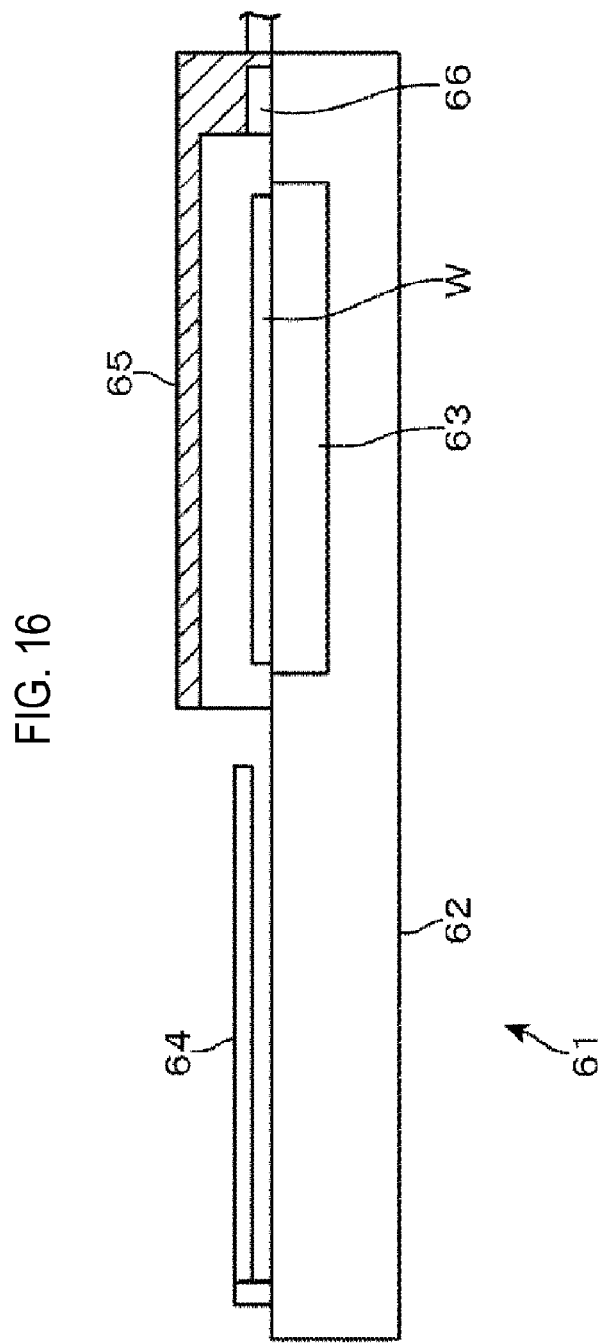
FIG. 16 is a side view of the heating module of FIG. 15, according to some embodiments.

Subsequently, a heating module 61 will be described as one example of a module which uses the sensing wafer 1 to acquire data on the gas current directions and speeds. FIGS. 15 and 16 are a plan view and a side view of the heating module 61, respectively. In FIGS. 15 and 16, reference numeral 62 denotes a base and reference numeral 63 denote a heating plate to heat the wafer W. Reference numeral 64 denote a cooling plate which cools the wafer W heated by the heating plate 63 and transfer the wafer W delivered from a transfer arm 60 to the heating plate 63.

Assuming that a side in which the heating plate 63 is disposed is a rear side and a side in which the cooling plate 64 is disposed is a front side, a cover 65 is formed to surround the top side, left side, right side and rear side of the heating plate 63 and a plurality of exhaust holes 66 is horizontally formed in the rear side. The wafer W is delivered from the cooling plate 64 to the heating plate 63 by means of elevating pins (not shown) provided in the heating plate 63. When the wafer W is delivered to the heating plate 63, gas is exhausted through the exhaust holes 66 and the wafer W is heated while being exposed to a gas current introduced from the front side of the cover 65 to the inside of the cover 65.

Next, a process of acquiring data of the gas current directions and speeds with respect to the heating module to heat the wafer W having a resist film formed thereon will be described. For example, a user loads the sensing wafer 1 on the heating plate 63 in a predetermined direction. When the user performs a predetermined operation through the operating panel 47, power is supplied to a circuit constituted by the gas current speed sensors 2A and 2B of each channel and temperature of the heater 22 of each pair of sensors 11 of the gas current speed sensors 2A and 2B is increased over the ambient temperature. Then, the checking mode is performed and the output voltages Vx and Vy and the detected currents Ax and Ay are transmitted from each channel to the controller 4 and are stored in a predetermined area of the table 44 in association. The program 48 determines whether the stored output voltages Vx and Vy of each channel fall within the allowable range and whether the stored detected currents Ax and Ay of each channel fall within the allowable range.

Figure 17:
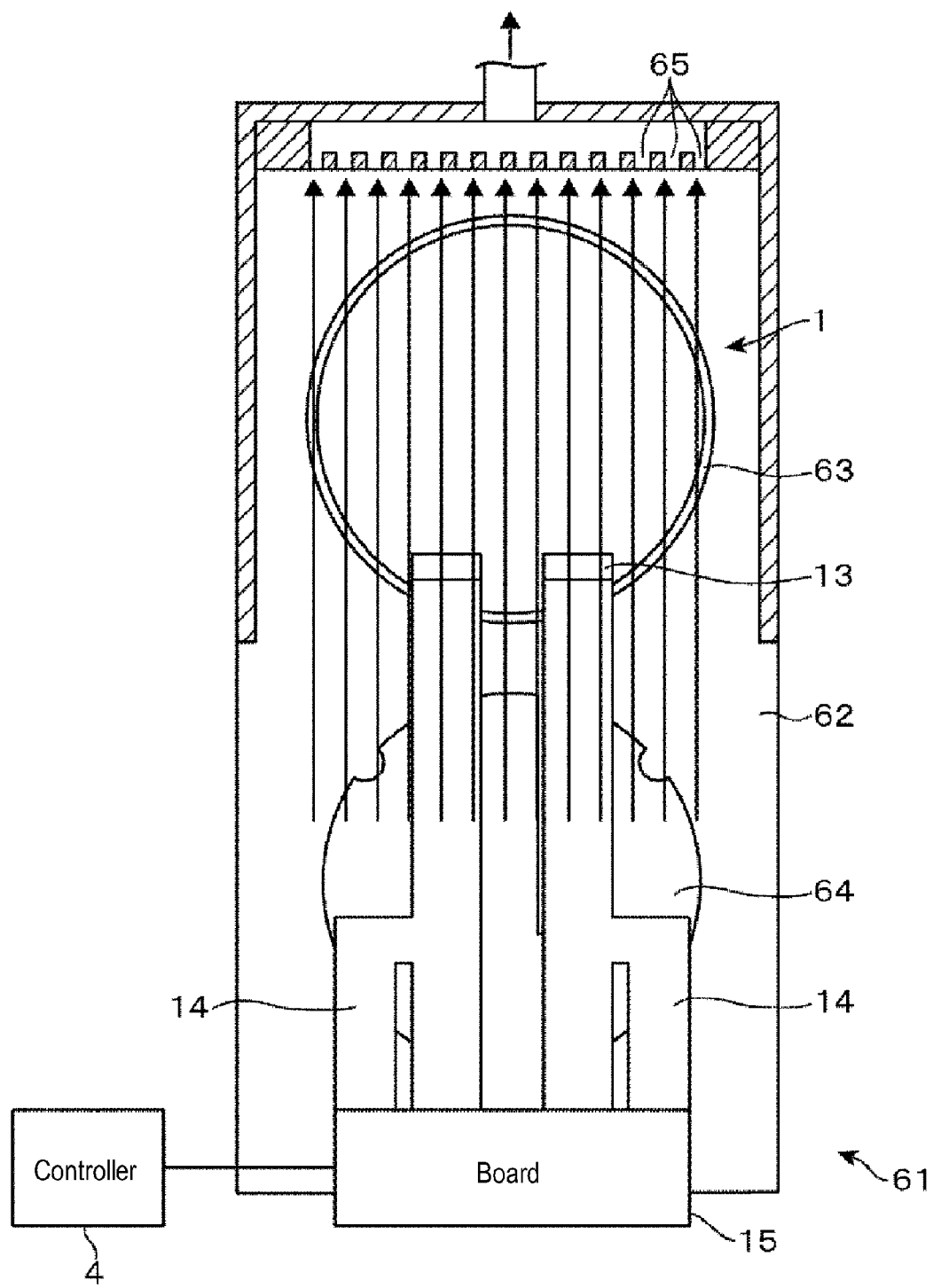
FIG. 17 is a plan view illustrating a state of measurement of the sensing wafer, according to some embodiments.

For channels in which both of the output voltages Vx and Vy and the detected currents Ax and Ay fall within the allowable range, this is displayed on the display unit 46. For channels in which one of the output voltages Vx and Vy and the detected currents Ax and Ay is out of the allowable range, this is displayed on the display unit 46. Thereafter, the user performs exhaustion through the exhaust holes 66 while increasing the temperature of the heating plate 63 of the heating module 61 to the process temperature of the wafer W. As indicated by arrows in FIG. 17, a gas current is formed on the surface of the sensing wafer 1. The temperature of the heater 22 is changed to a temperature higher than the ambient temperature in compliance with a change in the ambient temperature. When the user performs a predetermined operation through the operating panel 47 and instructs transition from the checking mode to the measuring mode, the output voltages Vx and Vy are transmitted from each pair of sensors 11 to the controller 4 and are stored in a predetermined area of the table.

As described above, the gas current speed Cx in the X direction and the gas current speed Cy in the Y direction are calculated from Vx and Vy and are stored in the table 4, while the gas current speed Cxy is calculated and stored in the table 44. Based on the stored Cx, Cy and Cxy, arrows representing the gas current directions and speeds and an image showing a distribution of gas current speeds are displayed on the display region 51. Based on this display, the user can adjust various components of the heating module 61 so that different portions of the sensing wafer 1 can provide highly-uniform gas current directions and speeds. This makes it possible to make a temperature distribution uniform in the planar surface of the wafer W in the course of the heating treatment.

When the sensing wafer 1 is used in this manner, it is possible to acquire data of the gas current directions and speeds in the omnidirectional range for different portions on the surface of the sensing wafer 1. Accordingly, any abnormality of the gas current directions and speeds determined by the modules can be correctly detected and sites corresponding to channels having abnormal modules can be adjusted, which can result in high uniformity of process in the planar surface of the wafer W and a higher yield. In addition, by using the sensing wafer 1 for making adjustment between plural modules performing the same process for the wafer W, it is possible to adjust the modules so that the wafer W can be processed with high uniformity between the modules.

The heating module performing the measurements of the gas current directions and speeds by means of the sensing wafer 1 is not limited to the above-described configuration. For example, the rear side in the cover 65 may be opened in addition to the front side, and the exhaust holes may be formed on the center of the heating plate 63 in the cover 65 instead of the rear side of the cover 65. In addition, when the wafer W is subjected to heat treatment, a gas current directing from the periphery of the wafer W to the center thereof is formed on the surface of the wafer W by performing exhaustion through the exhaust holes. The sensing wafer can be applied to such a heating module. That is, the sensing wafer 1 can be used irrespective of the gas current directions in the module.

Figure 18:
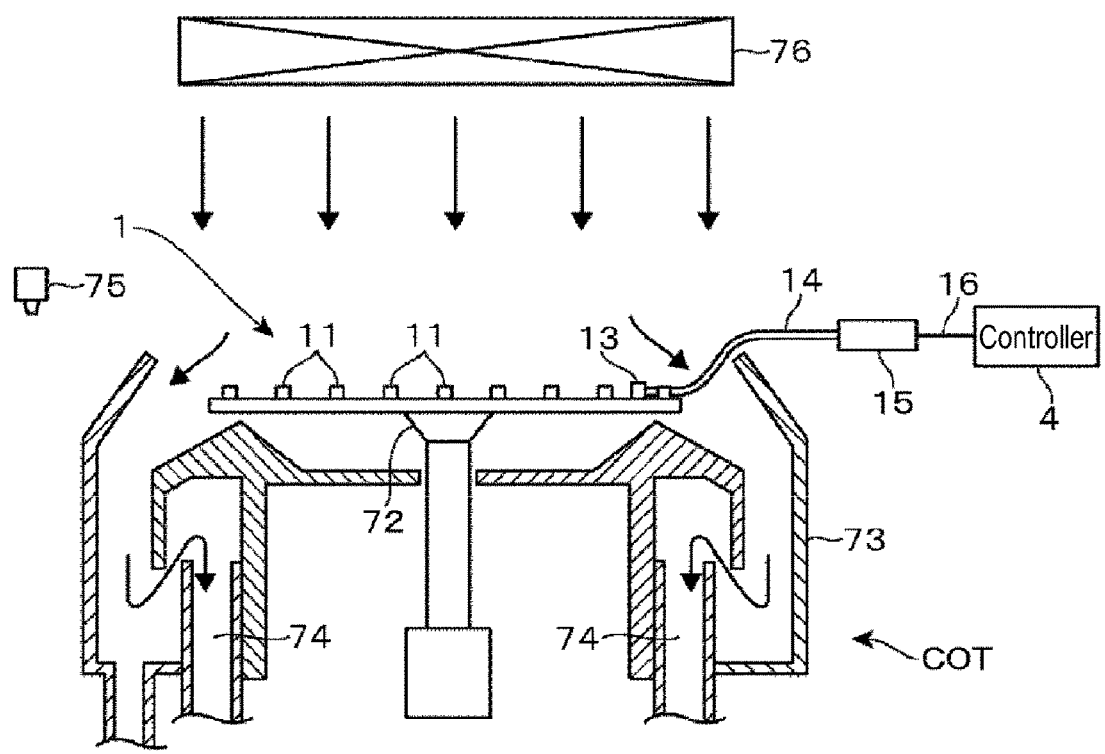
FIG. 18 is a side view of a resist coating module to which a sensing wafer is applied, according to some embodiments.

FIG. 18 is a side longitudinal sectional view of a resist coating module COT which coats a resist on the wafer W by means of spin coating. In FIG. 18, reference numeral 72 denotes a spin chuck which holds the wafer W and is rotated about a vertical axis. Reference numeral 73 denotes a cup-like component ("cup") of the COT which performs exhaustion from exhaust holes 74 formed in the lower part thereof. Reference numeral 75 denotes a resist supply nozzle which is movable between the center of the wafer W held by the spin chuck 72 and an outer region of the cup 73. Reference numeral 76 denotes a filter unit which supplies gas into the cup 73.

When acquisition of data of the gas current directions and speeds is measured by the sensing wafer 1, as in the process of the wafer W, under a state where a rear center of the sensing wafer 1 is held by the spin chuck 72 and the spin chuck 72 is stopped, data acquisition is performed by supplying gas from the filter unit 73 and exhausting gas from the cup 73 in a state where a rear center of the sensing wafer 1 is held by the spin chuck 72 and the spin chuck 72 is stopped, in a similar way as the process of the wafer W. In the resist coating module COT, the sensing wafer 1 can be also used to acquire the data of the gas current directions and speeds and adjust the module in a similar way as the heating module 61, which can result in high uniformity of the temperature distribution of the wafer W and hence high uniformity of coating treatment in the wafer W.

Figure 19:
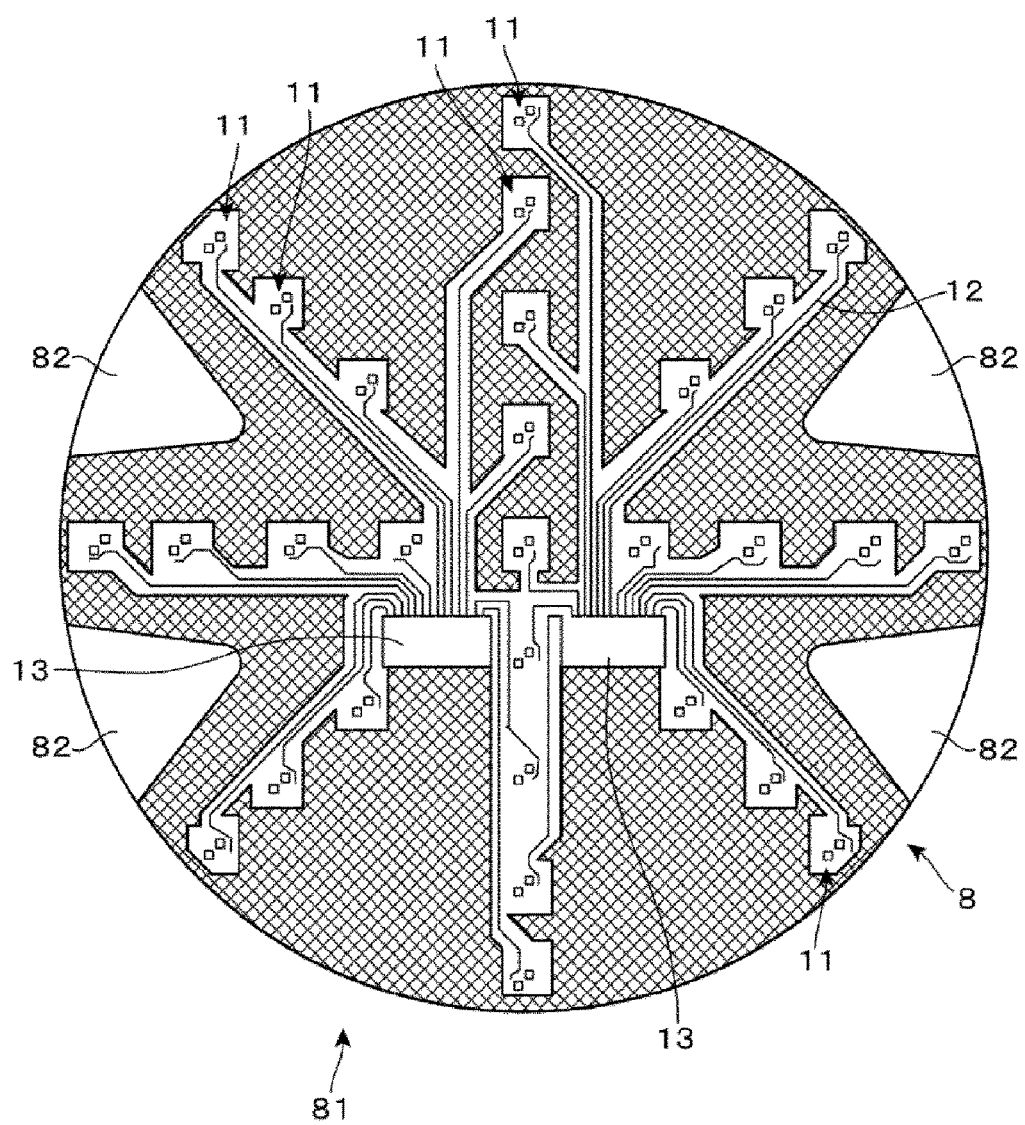
FIG. 19 is a plan view of another sensing wafer, according to some embodiments.

FIG. 19 is a plan view of a sensing wafer 8, which is a modification of the sensing wafer 1, according to some embodiments. The following description will be given with an emphasis placed on a difference between the sensing wafer 8 and the sensing wafer 1 with reference to FIG. 19. In the sensing wafer 8, a connector 13 is disposed near the center of the wafer W and a conductor pattern 12 is radially expanded from the connector 13 to each pair of sensors of each channel. In the figure, for the purpose of simplicity, the conductor pattern 12, which is actually composed of a plurality of parallel conductive lines, is drawn by one line.

The conductor pattern 12 is configured to be expanded from the vicinity of the center of the sensing wafer 8 to the periphery thereof in order to decrease wiring resistance of the pattern 12 and hence suppress noise. In the sensing wafer 8, the length of the conductor pattern 12 may be set to be less than 170 mm and the wiring resistance may be set to be less than 40Ω. It has been verified by experiments that signal noise is small if the wiring resistance is less than 40Ω, while the signal noise is increased if the wiring resistance exceeds 40Ω.

A mesh pattern 81 made of aluminum is formed around the conductor pattern 12. The mesh pattern 81 plays a role of a ground and is formed to limit impedance of the conductor pattern 12 and suppress signal noise transferred to the conductor pattern 12. In some embodiments, the mesh pattern 81 is formed to be finer than that shown in FIG. 19. For the purpose of noise prevention, it is preferable to increase an area of the pattern 81 to cover the sensing wafer 8. In other words, although a non-opened film may be preferred to the shown mesh-like opened film (pattern), the mesh pattern 81 is formed to prevent the sensing wafer 8 from being bent in the course of heating by the heating module 61 due to a difference in thermal expansion coefficient between silicon, of which the sensing wafer 1 is made, and the pattern 81. In FIG. 19, reference numeral 82 denotes a region which has no mesh pattern 82 and can be contacted by a user who treats the sensing wafer 8.

In the above-described examples, thickness of the sensing wafer is prevented from being increased by forming operational amplifiers (OPs) constituting the temperature compensation circuit 31 and the gas current speed detection circuit 33 on the board 15. This allows the gas current directions and speeds acquired by the sensing wafer to be approximate to the gas current directions and speeds formed in the process of the wafer W to manufacture a semiconductor product, which may result in a highly-precise measurement of the gas current directions and speeds. In addition, in order to prevent the gas current from being in disorder, although it has been illustrated in the above that the electrodes 22A to 26A of the speed sensors 2A and 2B are respectively connected to the electrodes 22C to 26C of the sensing wafer by means of the bonding wires 22B, a conductor of the sensing wafer may be disposed on the bottom of the speed sensors 2A and 2B, a through hole may be formed in the speed sensors 2A and 2B, and a conductor to connect the electrodes 22A to 26A of the speed sensors 2A and 2B and the electrodes 22C to 26C of the sensing wafer may be formed in the through hole.

Figure 20:
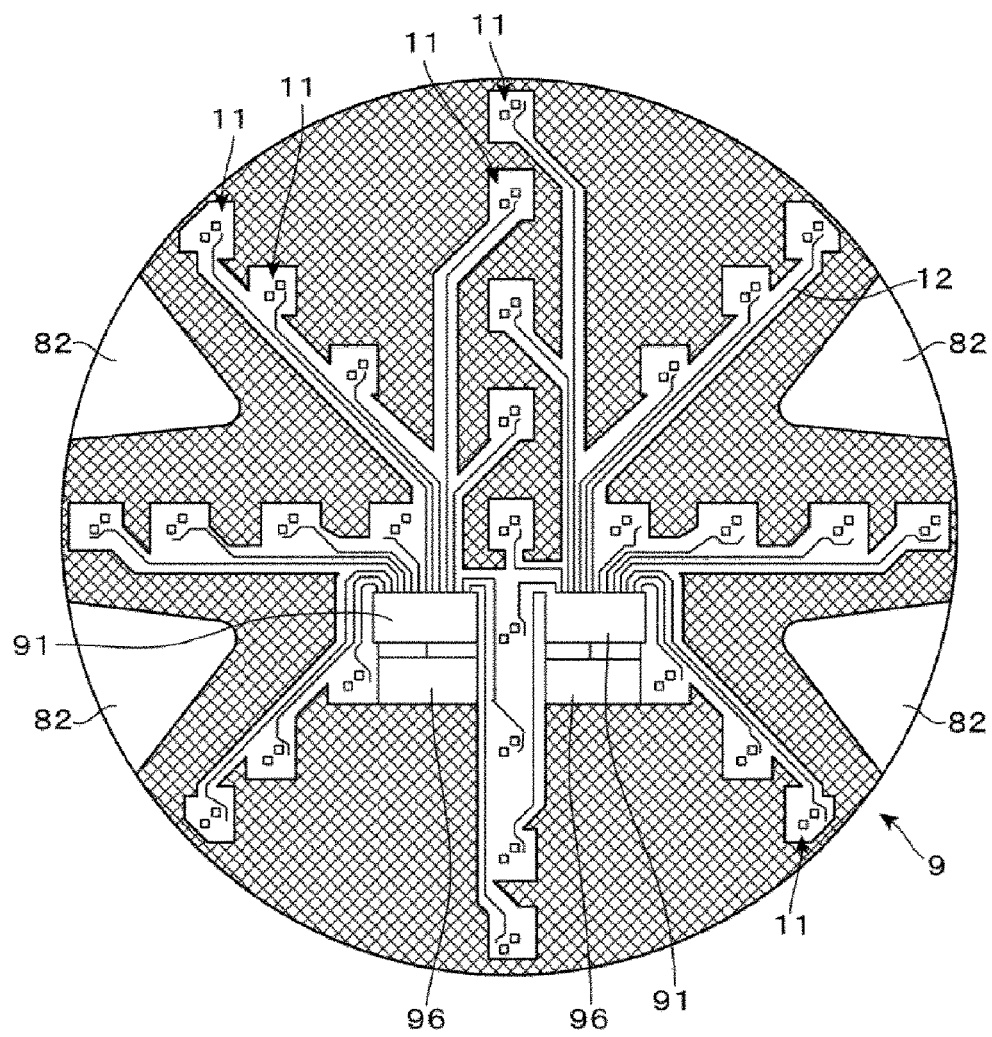
FIG. 20 is a plan view of another sensing wafer, according to some other embodiments.

The data of the gas current directions and speeds may be acquired after the sensing wafer is transferred to modules, such as the heating module 61, the resist coating module 71 or the like, by means of the transfer arm 60 to transfer the wafer W. FIG. 20 shows a sensing wafer 9 transferred by the transfer arm, according to some embodiments. The sensing wafer 9 includes a board 91 formed thereon. On the board 91 are formed circuit elements such as various resistors R1 to R7 constituting the temperature compensation circuit 31 and the gas current detection circuit 33 shown in FIGS. 5 and 6, the current detection circuit 31, the operational amplifiers OP1 and OP2, and additionally a communication circuit 97, switches 94 and 95, and an antenna 98 which will be described later. In addition, a battery 96 is disposed on the surface of the sensing wafer 9.

Figure 21:
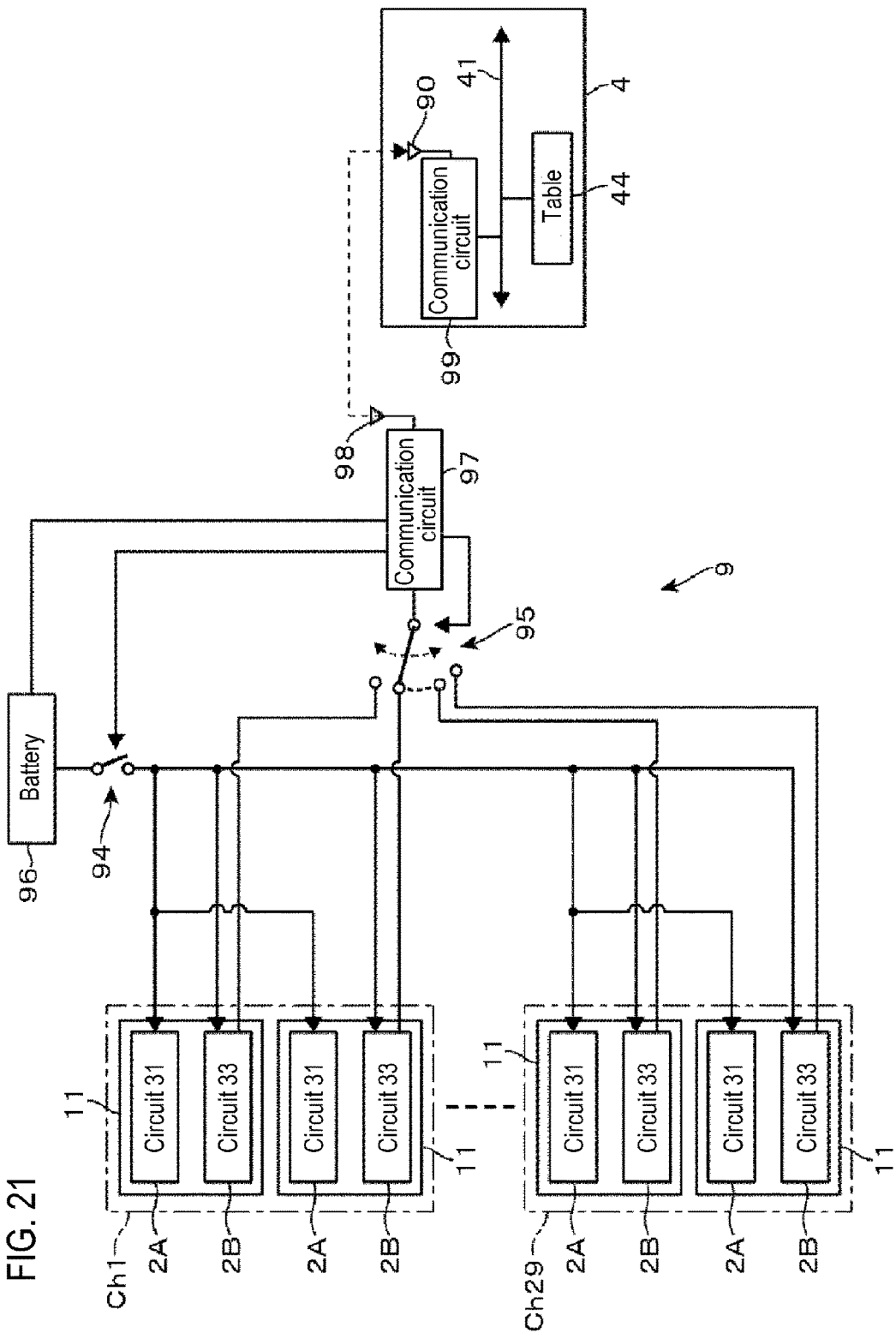
FIG. 21 is a schematic view of a sensing wafer, according to some embodiments.

FIG. 21 is a schematic view showing a configuration of the sensing wafer 9, according to some embodiments. As shown in FIG. 21, the battery 96 is connected to the temperature compensation circuit 31 and the gas current detection circuit 33 of each channel via the switch 94. The communication circuit 97 and the antenna 98 are connected to the read end of the gas current detection circuit 33 via the switch 95. The communication circuit 97 is connected to the battery 96 and switching of the switches 94 and 95 is controlled by the communication circuit 97. The controller 4 is provided with a communication circuit 99 and an antenna 90 corresponding to the communication circuit 97 and the antenna 98, respectively, in addition to the above-described configuration. For the purpose of simplicity, some of the above-described configuration is omitted in FIG. 21.

If acquisition of data by a module is not performed, the circuits 31 and 33 are not connected to the battery 96. When the sensing wafer 9 is transferred into the module, a signal is transmitted by wireless from the communication circuit 99 to the communication circuit 97 and the switch 94 is closed to supply power from the battery 96 to the circuits 31 and 33. Subsequently, the gas current speed detection circuit 33 of each channel is connected to the communication circuit 97 in order by means of the switch 95, and Ax, Ay, Vx and Vy of each channel are transmitted wirelessly from the antenna 98 to the antenna 90 of the controller 90 in order and are introduced via the communication circuit 99. That is, the output of each channel is substantially introduced into the controller 4 simultaneously as the switching of the switch 95 is performed at a high speed, although the output is introduced in a time-division manner. Thereafter, the gas current directions and speeds are displayed on the display unit 46, as described above.

Although it has been previously illustrated that the gas current speed sensor 2A and 2B are arranged such that the directions of detection of gas current speeds in the gas current speed sensors 2A and 2B are different by 90 degrees from each other, the detection directions are not limited thereto but may be inclined without being parallel to each other.

Figure 22:
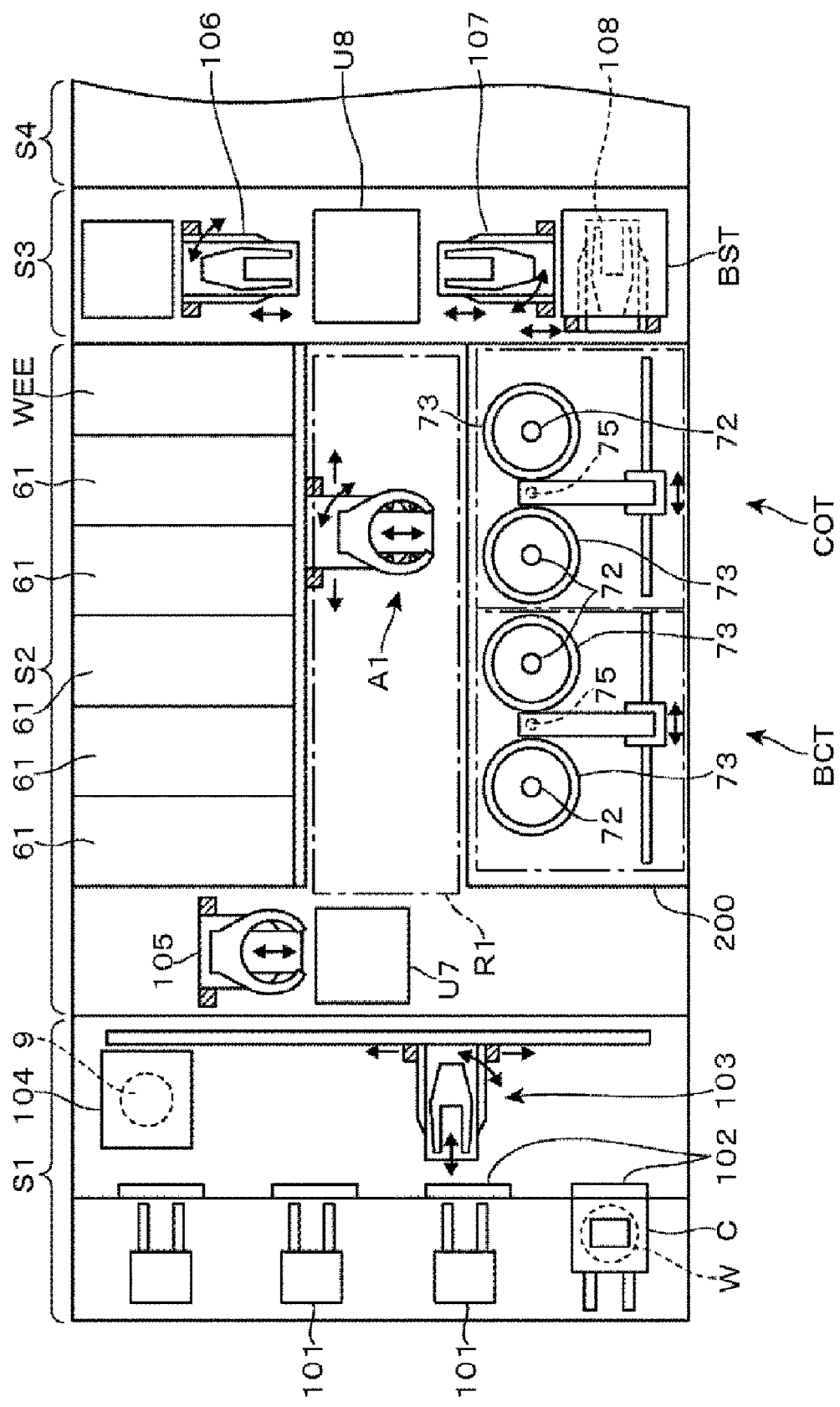
FIG. 22 is a plan view of a coating and developing device to which a sensing wafer is applied, according to some embodiments.
Figure 23:
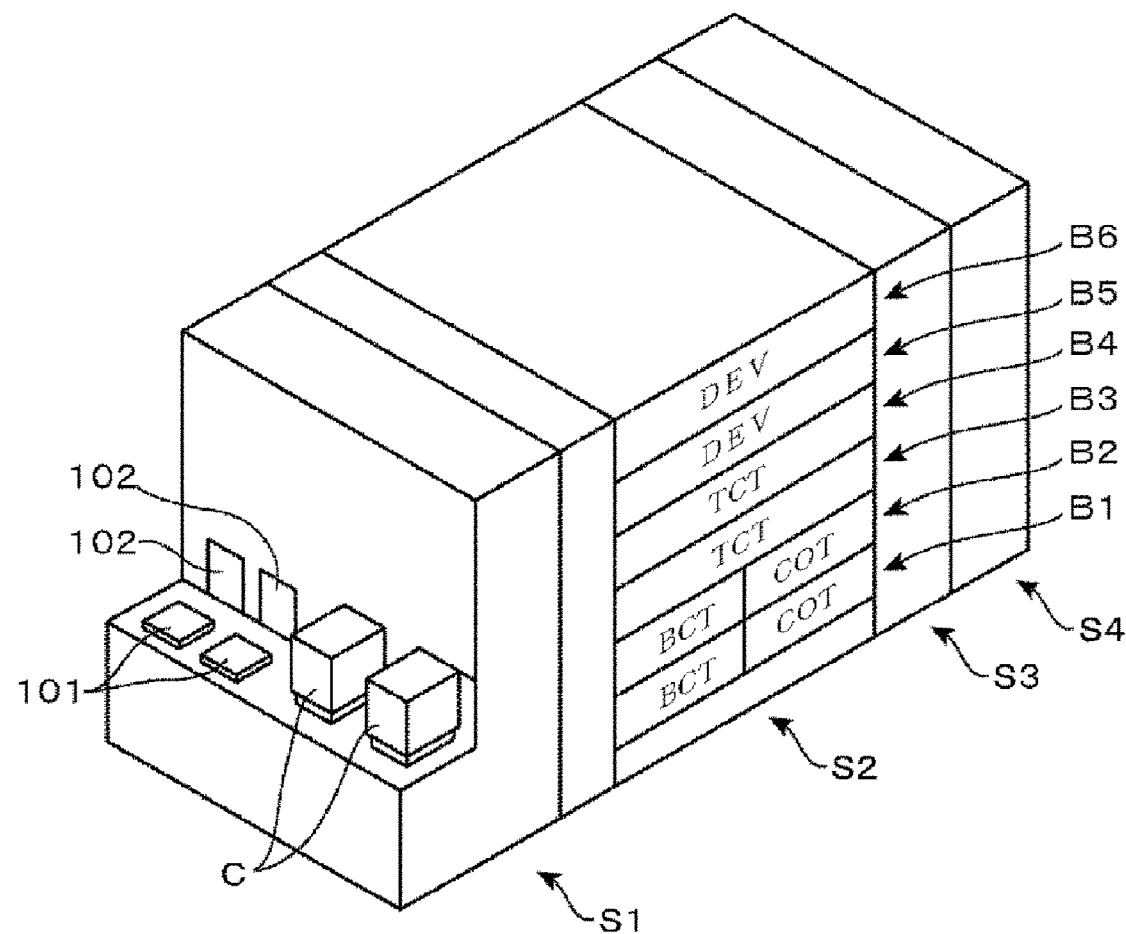
FIG. 23 is a perspective view of a coating and developing device, according to some embodiments.
Figure 24:
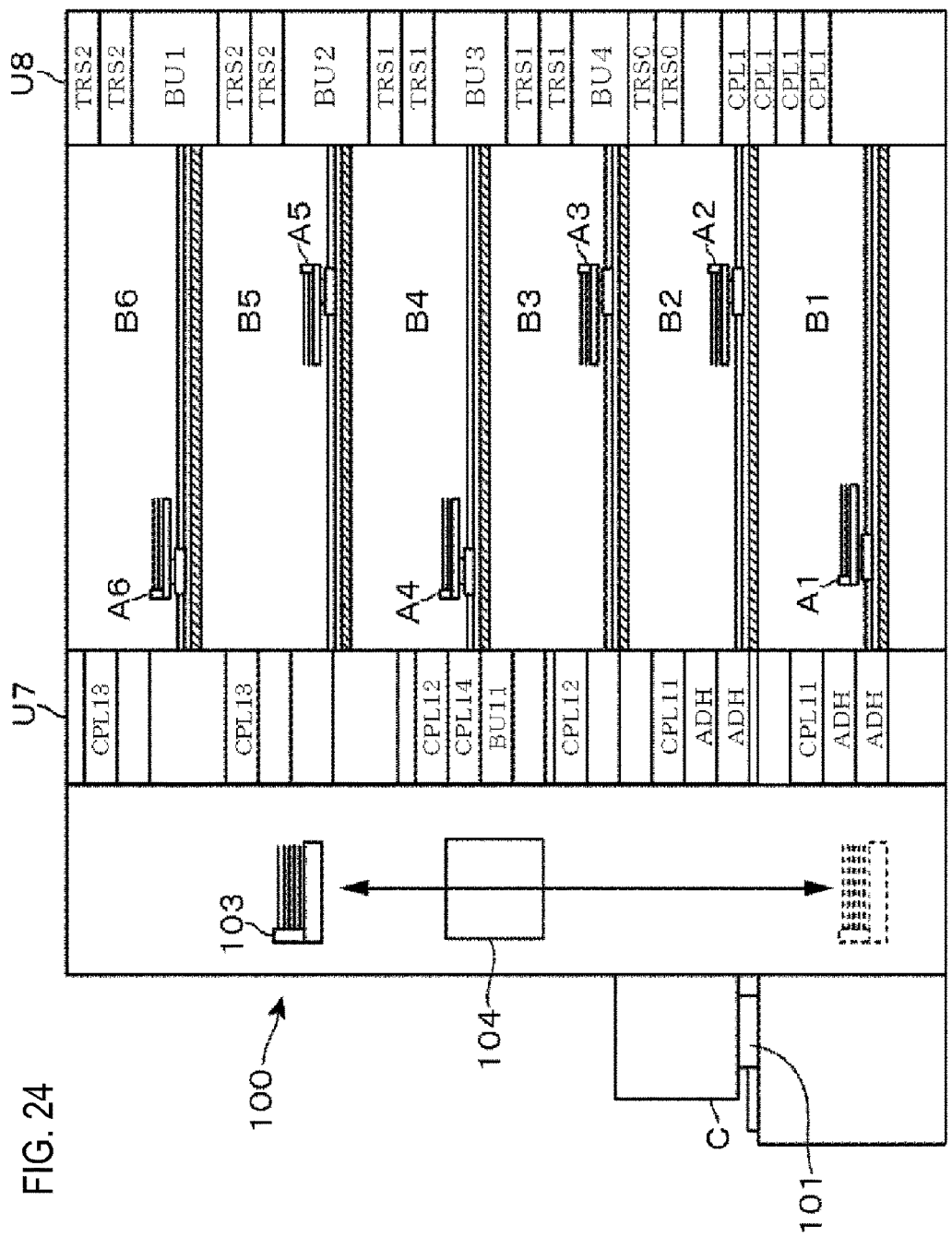
FIG. 24 is a side longitudinal sectional view of the coating and developing device of FIG. 23, according to some embodiments.

Subsequently, a coating and developing device 100 in which the above-described sensing wafer 9 is used will be described. FIGS. 22 to 24 are a plan view of the coating and developing device 100, a schematic perspective view thereof, and a schematic side view thereof, respectively. The coating and developing device 100 includes a carrier block S1, a processing block S2 and an interface block S3 connected in series. An exposure device S4 is connected to the interface block S3. In the following description, it is assumed that direction of arrangement of the blocks S1 to S3 is the forward-backward direction.

The carrier block S1 serves to transfer a carrier C storing the wafer W into/out of the coating and developing device 100 and includes a loader 101 of the carrier C, a shutter 102, and a transfer arm 104 which transfers the wafer W from the carrier C via the shutter 102. The carrier block S1 further includes a storage unit 104 which stores the sensing wafer 9.

The processing block S2 includes first to sixth unit blocks B1 to B6 which subject the wafer W to liquid treatment and are stacked in order from below. Pairs of unit blocks adjacent to each other of the unit blocks B1 to B6 have the same configuration. That is, the unit blocks B1 and B2 have the same configuration, the unit blocks B3 and B4 have the same configuration, and the unit blocks B5 and B6 have the same configuration.

As to the first unit block B1 shown in FIG. 22, a liquid treatment unit 200 and shelf units U1 to U6 are respectively disposed in the left and right sides of a transfer region R directing from the carrier block S1 to the interface block S3, and an anti-reflective film forming module BCT and the above-described resist coating module COT are provided in the liquid treatment unit 200. The anti-reflective film forming module BCT has the same configuration as the resist coating module COT except that the former supplies chemicals used to form an anti-reflective film.

Within the transfer region R is disposed a transfer arm A1 which is a transfer mechanism of each wafer and corresponds to the above-described transfer arm 60. The transfer arm A1 is configured to be movable forward/backward, elevate up and down, rotatable about a vertical axis, and movable in the longitudinal direction of the transfer region R, and can deliver the wafer between all modules of the unit block B1. The shelf units U1 to U6 are arranged along the longitudinal direction of the transfer region R and the shelf units U1 to U5 are configured such that the above-described heating modules are stacked, for example in a two stage.

The shelf unit U6 is constituted by a stacked circumference exposure module WEE. The circumference exposure module WEE exposes the circumference of the wafer W after the resist coating. This module WEE includes a spin chuck. This spin chuck holds the center of the wafer W and rotates the wafer W about a vertical axis. The module WEE further includes an irradiation part for irradiating the circumference of the wafer W with light from above and a light receiving part for receiving this light from below the wafer W. A cutout (notch N) formed in the circumference of the wafer W may be detected based on a change in light amount received in the light receiving part and the notch N may be directed in a predetermined direction by means of the spin chuck.

The unit blocks B3 to B6 has the same configuration as the unit blocks B1 and B2 except that the former is different in chemicals supplied from the liquid treatment unit 200 onto the wafer W from the latter and includes a heating module instead of the circumference exposure module. The unit blocks B3 and B4 include protective film forming modules TCT1 and TCT2 instead of the anti-reflective film forming module BCT and the resist coating module COT. The anti-reflective film forming module BCT, the resist coating module COT and the protective film forming modules TCT are assumed as coating forming modules. The unit blocks B5 and B6 include developing modules DEV1 and DEV2 instead of the anti-reflective film forming module BCT and the resist coating module COT.

The protective film forming modules TCT and the developing modules DEV have substantially the same configuration as the resist coating module COT except chemicals supplied onto the wafer W. The protective film forming modules TCT supplies protective film formation chemicals for protecting the surface of the wafer W in immersion exposure onto the wafer W and the developing modules DEV supplies a developer into the wafer W. Transfer arms of the unit blocks B1 to B6 are denoted by reference numerals A1 to A6 in the figures and correspond to the above-described transfer arms 60.

A shelf unit U7 spanning over the unit blocks B is disposed in the side of the carrier block S1 of the transfer region R. The shelf unit U7 is constituted by a plurality of stacked modules including transfer modules CPL11 to CPL13 disposed at a height position of each unit block, a transfer module CPL14, a buffer module BU11 and a hydrophobic treatment module ADH. Here, a transfer module denoted by CPL includes a cooling stage for cooling the loaded wafer W. The buffer module stores a plurality of wafers W. The hydrophobic treatment module ADH supplies process gas onto the wafer W and makes the surface of the wafer W hydrophobic. A transfer arm 105 which can be elevated and moved forward/backward with respect to the shelf unit U7 is disposed near the shelf unit U7 and the wafer W is transferred between modules of the shelf unit U7.

The interface block S3 includes a shelf unit U8 constituted by stacked transfer modules TRS0 to TRS2, a transfer module CPL1 and buffer modules BU1 to BU4. The interface block S3 serves to transfer the wafer W by means of first to third interface arms 106 to 108 between each unit block B1 to B6 and the exposure device S4. The interface block S3 further includes a rear surface cleaning module BST which cleans the rear surface of the wafer W by means of a brush before the exposure, and a post-exposure cleaning module PIR which cleans the front surface of the wafer W after the exposure.

A transfer path of the wafer W in the system including the coating and developing device 100 and the exposing device S4 will be now described. For example, the wafer W is transferred along path 1 passing through unit blocks (B1, B3 and B5 sequentially) and path 2 passing through unit blocks (B2, B4 and B6 sequentially) and is subjected to the same treatment in these paths. The wafer transfer in path 1 will be hereinafter described in more detail.

The wafer W is transferred in the order of the carrier C, the transfer arm 103, the buffer module BU11, the transfer arm 103, the hydrophobic treatment module ADH, the transfer arm A1, the anti-reflective film forming module BCT, the transfer arm A1, the heating module, the transfer arm A1, the resist coating module COT, the transfer arm A1, the heating module 61, the circumference exposure module WEE, the transfer arm A1 and the transfer module CPL11, and coatings are stacked on the surface of the wafer W in the order of an anti-reflective film and a resist film from below.

Thereafter, the wafer W is transferred in the order of the transfer arm 105, the transfer module CPL12, the transfer arm A3, the protective film forming module TCT, the transfer arm A3, the heating module 61, the transfer arm A3 and the transfer module TRS1. Accordingly, a protective film is formed on the resist film and the wafer W is carried into the interface block S3.

The wafer W is transferred in the order of the first interface arm 106, the rear surface cleaning module BST, the first interface arm 106, the buffer module group BU, the second interface arm 107, the transfer module CPL1, the third interface arm 108 and the exposing device S4, and is subjected to rear surface cleaning treatment and then immersion exposure.

The wafer W subjected to the immersion exposure is transferred in the order of the third interface arm 108, the transfer module TRS0, the second interface arm 107, the post-exposure cleaning module PIR, the buffer module group BU, the second interface arm 107, the transfer module TRS2. Thereafter, this wafer W is transferred in the order of the transfer arm A5, the heating module 61, the developing modules DEV, the transfer arm A5, the heating module 61, the transfer arm A5, the transfer module CPL13, the transfer arm 105, the transfer module CPL14, the transfer arm 103 and the carrier C.

The sensing wafer 9 is transferred in the above-mentioned order of transfer modules, like the wafer W, from the storage unit 104, instead of being transferred from the carrier C and then is transferred to the circumference exposure module WEE of the unit block B1 or B2. In this course, the notch N of the sensing wafer 9 is detected and the direction of the sensing wafer 9 is adjusted to direct the notch N to a predetermined direction. Thereafter, the wafer 9 is transferred from this module WEE between transfer modules for measurement and, after being measured, is again transferred between the transfer modules and is returned to the storage unit 104. In this manner, by adjusting the direction of the sensing wafer 9 in the module WEE, positions of pairs of sensors are adjusted to the modules for measurement. Accordingly, when abnormalities of the gas current directions and/or speeds in the planar surface of the sensing wafer 9 are detected, maintenance time can be saved since sites having a module problem can be easily specified. In addition, the sensing wafer 9 may be stored in the carrier C and may be transferred to the coating and developing device 100.

According some embodiments of the present disclosure, a measurement is performed by using a sensing substrate on which a plurality of pairs of sensors including a first sensor for acquiring data of vector of a gas current in a first linear direction and a second sensor for acquiring data of vector of the gas current in a second linear direction are formed, and the gas current directions on a set starting point can be calculated by combining these vectors. Accordingly, it is possible to acquire data on the gas current directions in different portions in a planar surface of the substrate.

While certain embodiments have been described, these embodiments have been presented by way of example only, and are not intended to limit the scope of the disclosures. Indeed, the novel methods and apparatuses described herein may be embodied in a variety of other forms; furthermore, various omissions, substitutions, combinations, and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A data acquisition method of a substrate processing apparatus including a loader on which a substrate is loaded, a direction adjustor which adjusts a direction of a sensing substrate having a plurality of sensors including a first sensor and a second sensor for acquiring a vector data of a gas current, the plurality of sensors being placed radially on the sensing substrate, a first transfer arm that transfers the sensing substrate between the direction adjustor and a storage which stores the sensing substrate, a second transfer arm that transfers the sensing substrate in which the direction of the sensing substrate is adjusted by the direction adjustor to the loader, and a controller that acquires data on gas current directions in a plurality of measurement regions on a surface of the substrate loaded on the loader, the method comprising:

loading the sensing substrate into the substrate processing apparatus;

acquiring a first vector data of the gas current in a first linear direction along the surface of the sensing substrate by the first sensor;

acquiring a second vector data of the gas current in a second linear direction slanted relative to the first linear direction along the surface of the sensing substrate by the second sensor;

obtaining, by a current measurer installed on the sensing substrate, a current value data of a current flowing through each of a first circuit including a first sensor and a second circuit including a second sensor;

transmitting wirelessly to the controller, by a transmitter installed on the sensing substrate, the first vector data, the second vector data, and the current value data;

combining the wirelessly transmitted first vector data and second vector data based on a predetermined starting point associated with the first sensor and the second sensor forming a pair of sensors;

calculating a gas current direction and a gas current speed from the starting point associated with the respective pair of sensors;

detecting whether each of the first vector data, the second vector data, and the current value data are within an allowable range;

checking a connection between a first electrode of the pair of sensor and a second electrode of the sensing substrate using a result of the detected first vector data, second vector data, and current value data, the first electrode being exposed to the first sensor and the second sensor and the second electrode being exposed to the sensing substrate; and adjusting a heater of the substrate processing apparatus using at least one of the gas current direction and the gas current speed calculated from the starting point.

2. The data acquisition method of claim 1, wherein the first or second vector data of the gas current is a data on the gas current speed, said data acquisition method further comprising combining the wirelessly transmitted first vector data and second vector data of the gas current based on the predetermined starting point associated with the pair of sensors and calculating a gas current speed from the starting point associated with the pair of sensors.

3. The data acquisition method of claim 1, wherein an angle between the first linear direction and the second linear direction is 90 degrees.

4. The data acquisition method of claim 1, further comprising displaying on a display at least one of the gas current direction and the gas current speed calculated from the starting point.

5. A substrate processing apparatus comprising:

a loader on which a substrate is loaded;

a sensing substrate that acquires data on gas current directions in a plurality of measurement regions on a surface of the substrate loaded on the loader;

a direction adjustor that adjusts a direction of the sensing substrate;

a first transfer arm that transfers the sensing substrate between the direction adjustor and a storage which stores the sensing substrate;

a second transfer arm that transfers the sensing substrate in which the direction of the sensing substrate is adjusted by the direction adjustor to the loader; and a controller, wherein the sensing substrate includes:

a plurality of first sensors that acquires a first vector data of a gas current in a first linear direction along a surface of the sensing substrate;

a plurality of second sensors, each of which is paired with each of the first sensors, that acquires a second vector data of a gas current in a second linear direction slanted relative to the first linear direction along the surface of the sensing substrate, the plurality of first sensors and the plurality of second sensors being placed radially on the sensing substrate;

a current measurer that obtains a current value data of a current flowing through each of a first circuit including one of the plurality of first sensors and a second circuit including one of the plurality of second sensors; and a transmitter transmitting wirelessly the first vector data, the second vector data, and the current value data to the controller, and wherein the controller controls to perform:

detecting whether each of the first vector data, the second vector data, and the current value data are within an allowable range;

checking a connection between a first electrode of the pair of sensor and a second electrode of the sensing substrate using a result of the detected first vector data, second vector data, and current value data, the first electrode being exposed to the first sensor and the second sensor and the second electrode being exposed to the sensing substrate; and adjusting a heater of the substrate processing apparatus using the gas current directions.

6. The sensing substrate of claim 5, wherein the first or second vector data of the gas current is data on a gas current speed.

7. The sensing substrate of claim 5, wherein an angle between the first linear direction and the second linear direction is 90 degrees.

8. The sensing substrate of claim 5, wherein a wiring pattern constituting a signal path is formed on the surface of the sensing substrate, and a metal film having a mesh pattern is formed around the wiring pattern configured to prevent noise of the signal.

* * * * *